United States Patent
Yamada et al.

(10) Patent No.: US 6,442,327 B1
(45) Date of Patent: Aug. 27, 2002

(54) VIDEO DATA RECORDING AND REPRODUCING APPARATUS INCLUDING A PLURALITY OF RECORDING MEDIA HAVING DIFFERENT CAPACITIES

(75) Inventors: Hiroshi Yamada, Yokohama; Takeshi Okauchi, Chgasaki; Hironori Akasaka, Sagamihara; Koji Suzuki, Yokohama; Hiroyuki Kitamura, Hiratsuka, all of (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/052,011

(22) Filed: Mar. 31, 1998

(30) Foreign Application Priority Data

Apr. 1, 1997 (JP) .............................. 9-098003

(51) Int. Cl.[7] .......................... H04N 5/91; H04N 7/00; H04N 5/90; H04N 5/85; H04N 5/781
(52) U.S. Cl. ......................... 386/46; 386/125
(58) Field of Search ............... 386/1, 33, 45, 386/46, 125, 126, 67–70

(56) References Cited

U.S. PATENT DOCUMENTS

| | | | |
|---|---|---|---|
| 5,371,551 A | * 12/1994 | Logan et al. ............... 386/112 |
| 5,390,027 A | * 2/1995 | Henmi et al. ............... 386/83 |
| 5,432,769 A | * 7/1995 | Honjo ......................... 369/60 |
| 5,552,779 A | * 9/1996 | Gaskill et al. ............ 340/7.56 |
| 5,576,838 A | * 11/1996 | Renie ......................... 386/117 |
| 5,699,474 A | * 12/1997 | Suzuki et al. ............... 386/68 |
| 5,949,795 A | * 9/1999 | Moroney et al. ........... 348/10 |
| 6,018,612 A | * 1/2000 | Thomason et al. .......... 386/82 |
| 6,137,544 A | * 10/2000 | Dimitrova et al. .......... 386/69 |
| 6,169,842 B1 | * 1/2001 | Pijnenburg et al. .......... 386/46 |

FOREIGN PATENT DOCUMENTS

| | | | |
|---|---|---|---|
| EP | 0578124 | 1/1994 | |
| JP | 62-167691 | 7/1987 | |
| JP | 63-76168 | 4/1988 | |
| JP | 3-59847 | 3/1991 | |
| JP | 8-186791 | 7/1996 | |
| JP | 8-237600 | 9/1996 | |
| JP | 8-275102 | 10/1996 | |
| WO | 9633579 | * 10/1996 | .......... H04N/9/804 |

OTHER PUBLICATIONS

PCT WO 96/33579, Krause et al., Oct. 1996.*

* cited by examiner

Primary Examiner—Wendy R. Garber
Assistant Examiner—Polin Chieu
(74) Attorney, Agent, or Firm—Israel Gopstein

(57) ABSTRACT

A digital data recording and reproducing apparatus includes a first recording medium having a first recording capacity, and a second recording medium having a second recording capacity greater than the first recording capacity. An input digital video signal is recorded on the first recording medium as an inward-flow signal. The inward-flow signal is transferred from the first recording medium to the second recording medium each time an amount of the inward-flow signal on the first recording medium reaches a first predetermined amount. The digital video signal is transferred from the second recording medium to the first recording medium as an outward-flow signal. The outward-flow signal is read out from the first recording medium as an output digital video signal. During a search, the outward-flow signal is read out from the first recording medium. During the search, monitoring is made regarding an amount of the outward-flow signal on the first recording medium which has not yet been read out. During the search, the digital video signal is transferred from the second recording medium to the first recording medium when the monitored amount decreases to a second predetermined amount.

6 Claims, 11 Drawing Sheets

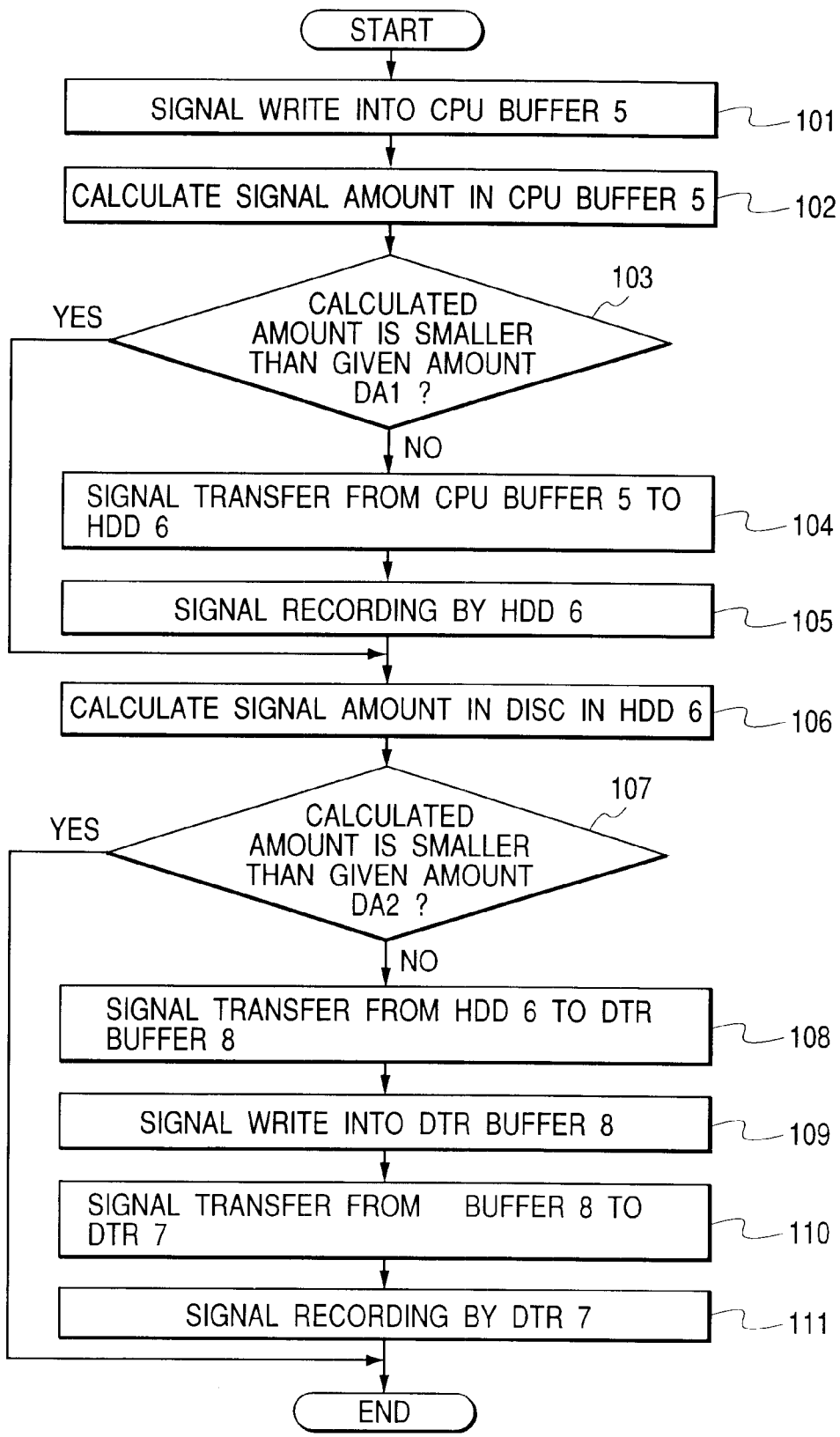

VIDEO DATA RECORDING AND REPRODUCING APPARATUS INCLUDING A PLURALITY OF RECORDING MEDIA HAVING DIFFERENT CAPACITIES

BACKGROUND OF THE INVENTION

1. Field of the Invention

This invention relates to an apparatus for recording digital video data. In addition, this invention relates to an apparatus for reproducing digital video data. Also, this invention relates to an apparatus for recording and reproducing digital video data.

2. Description of the Related Art

In general, traffic-condition monitoring systems, automatic-cash dispenser monitoring systems, and other monitoring systems include television cameras for converting scenes of interest into corresponding video signals. The video signals generated by the television cameras are recorded on suitable recording mediums such as magnetic tapes, magnetic discs, or magneto-optical discs.

In some monitoring systems, recording mediums are required to continuously record a video signal for 24 hours. Usual magnetic discs and magneto-optical discs have relatively-small recording capacities so that they are unsuited to such long-time continuously recording of video signals.

Japanese published unexamined patent application 8-237600 discloses a monitoring system in which an original video signal is deteriorated into a lower-data-rate video signal, and a hard disc drive (HDD) records the lower-data-rate video signal on a magnetic disc. The deterioration of the original video signal into the lower-data-rate video signal enables a longer recording time.

There are time-lapse VTR's (video tape recorders) which intermittently execute recording for 24 hours. It is known to use such a time-lapse VTR in recording a video signal generated by a monitoring system. In the time-lapse VTR, a search for a desired scene represented by the video signal on a magnetic tape tends to take a relatively long access time.

SUMMARY OF THE INVENTION

It is a first object of this invention to provide an improved apparatus for recording digital video data.

It is a second object of this invention to provide an improved apparatus for reproducing digital video data.

It is a third object of this invention to provide an improved apparatus for recording and reproducing digital video data.

A first aspect of this invention provides a digital data recording and reproducing apparatus comprising a first recording medium having a first recording capacity; a second recording medium having a second recording capacity greater than the first recording capacity; first means for recording an input digital video signal on the first recording medium as an inward-flow signal; second means for transferring the inward-flow signal from the first recording medium to the second recording medium each time an amount of the inward-flow signal on the first recording medium reaches a first predetermined amount; third means for transferring the digital video signal from the second recording medium to the first recording medium as an outward-flow signal; fourth means for reading out the outward-flow signal from the first recording medium as an output digital video signal; fifth means for, during a search, reading out the outward-flow signal from the first recording medium; sixth means for, during the search, monitoring an amount of the outward-flow signal on the first recording medium which has not yet been read out by the fifth means; and seventh means for, during the search, transferring the digital video signal from the second recording medium to the first recording medium when the amount monitored by the sixth means decreases to a second predetermined amount.

A second aspect of this invention provides a digital data reproducing apparatus comprising a first recording medium having a first recording capacity and storing a digital video signal; a second recording medium having a second recording capacity smaller than the first recording capacity; first means for transferring the digital video signal from the first recording medium to the second recording medium; second means for reading out the digital video signal from the second recording medium as an output digital video signal; third means for, during a search, reading out the digital video signal from the second recording medium; fourth means for, during the search, monitoring an amount of the digital video signal on the second recording medium which has not yet been read out by the third means; and fifth means for, during the search, transferring the digital video signal from the first recording medium to the second recording medium when the amount monitored by the fourth means decreases to a second predetermined amount.

A third aspect of this invention is based on the second aspect thereof, and provides a digital data reproducing apparatus wherein the fifth means comprises means for writing the digital video signal on the second recording medium on an overwrite basis.

A fourth aspect of this invention is based on the second aspect thereof, and provides a digital data reproducing apparatus wherein the second predetermined amount corresponds to about one third of a given recording area of the second recording medium.

A fifth aspect of this invention provides a digital data recording apparatus comprising a first recording medium having a first recording capacity; a second recording medium having a second recording capacity greater than the first recording capacity; first means for recording a digital video signal on the first recording medium; second means for detecting an amount of the digital video signal on the first recording medium; and third means for transferring the digital video signal from the first recording medium to the second recording medium each time the amount detected by the second means reaches a predetermined amount; wherein the recording of the digital signal on the first recording medium by the first means and the transfer of the digital video signal from the first recording medium by the third means are implemented on a time sharing basis.

A sixth aspect of this invention is based on the fifth aspect thereof, and provides a digital data recording apparatus further comprising a signal compressor for compressing an input video signal into a compression-resultant video signal, and for outputting the compression-resultant video signal to the first means as the digital video signal.

A seventh aspect of this invention is based on the sixth aspect thereof, and provides a digital data recording apparatus wherein a data rate related to the transfer of the digital video signal to the second recording medium by the third means is greater than a data rate related to the digital video signal outputted by the signal compressor.

An eighth aspect of this invention is based on the fifth aspect thereof, and provides a digital data recording apparatus wherein the second recording medium comprises a magnetic tape.

A ninth aspect of this invention provides a digital data recording and reproducing apparatus comprising a first recording medium having a first recording capacity; a second recording medium having a second recording capacity greater than the first recording capacity; first means for recording an input digital video signal on the first recording medium as an inward-flow signal; second means for transferring the inward-flow signal from the first recording medium to the second recording medium each time an amount of the inward-flow signal on the first recording medium reaches a predetermined amount; third means for transferring the digital video signal from the second recording medium to the first recording medium as an outward-flow signal; and fourth means for reading out the outward-flow signal from the first recording medium as an output digital video signal.

A tenth aspect of this invention is based on the ninth aspect thereof, and provides a digital data recording and reproducing apparatus wherein a data rate related to the transfer of the digital video signal to the second recording medium by the second means is greater than a data rate related to the input digital video signal.

An eleventh aspect of this invention is based on the ninth aspect thereof, and provides a digital data recording and reproducing apparatus further comprising fifth means for collating a portion of the digital video signal on the second recording medium with a corresponding portion of the inward-flow signal on the first recording medium to decide whether or not the portion of the digital video signal on the second recording medium is correct.

A twelfth aspect of this invention is based on the eleventh aspect thereof, and provides a digital data recording and reproducing apparatus further comprising sixth means for transferring the portion of the inward-flow signal from the first recording medium to the second recording medium when the fifth means decides that the portion of the digital video signal on the second recording medium is not correct.

A thirteenth aspect of this invention is based on the ninth aspect thereof, and provides a digital data recording and reproducing apparatus further comprising fifth means for deciding whether or not the amount of the inward-flow signal on the first recording medium reaches a given amount, and sixth means for generating a warning signal when the fifth means decides that the amount of the inward-flow signal on the first recording medium reaches the given amount.

A fourteenth aspect of this invention provides a digital data reproducing apparatus comprising a first recording medium having a first recording capacity and storing a digital video signal; a second recording medium having a second recording capacity smaller than the first recording capacity; first means for transferring the digital video signal from the first recording medium to the second recording medium; and second means for reading out the digital video signal from the second recording medium as an output digital video signal.

A fifteenth aspect of this invention provides a digital data recording apparatus comprising a first recording medium having a first recording capacity; a second recording medium having a second recording capacity greater than the first recording capacity; first means for recording a digital video signal on the first recording medium; second means for detecting an amount of the digital video signal on the first recording medium; third means for transferring the digital video signal from the first recording medium to the second recording medium each time the amount detected by the second means reaches a predetermined amount; fourth means for extracting portions of the digital video signal and combining the extracted portions into a digest signal; fifth means for recording the digest signal generated by the fourth means on the first recording medium; and sixth means for transferring the digest signal from the first recording medium to the second recording medium.

A sixteenth aspect of this invention is based on the fifteenth aspect thereof, and provides a digital data recording apparatus wherein the fourth means comprises means for periodically extracting portions of the digital video signal at a predetermined period and combining the extracted portions into the digest signal.

A seventeenth aspect of this invention is based on the fifteenth aspect thereof, and provides a digital data recording apparatus wherein each of the portions of the digital video signal which are extracted by the fourth means corresponds to a given number of successive frames.

An eighteenth aspect of this invention is based on the fifteenth aspect thereof, and provides a digital data recording apparatus further comprising seventh means for deciding whether or not the second recording medium is requested to be ejected, and eighth means for, in cases where the seventh means decides that the second recording medium is requested to be ejected, allowing the second recording medium to be ejected after the sixth means transfers the digest signal from the first recording medium to the second recording medium.

A nineteenth aspect of this invention is based on the fifteenth aspect thereof, and provides a digital data recording apparatus wherein the second recording medium has a first region assigned to the digital video signal and a second region assigned to the digest signal, the second region preceding the first region as viewed along a normal playback direction.

A twentieth aspect of this invention is based on the fifteenth aspect thereof, and provides a digital data recording apparatus further comprising seventh means for recording a position marking signal on the second recording medium, the position marking signal representing positions of portions of the digital video signal on the second recording medium which correspond to the digest signal.

A twenty-first aspect of this invention provides a digital data recording and reproducing apparatus comprising a first recording medium having a first recording capacity; a second recording medium having a second recording capacity greater than the first recording capacity; first means for recording an input digital video signal on the first recording medium as an inward-flow video signal; second means for transferring the inward-flow video signal from the first recording medium to the second recording medium each time an amount of the inward-flow video signal on the first recording medium reaches a first predetermined amount; third means for transferring the digital video signal from the second recording medium to the first recording medium as an outward-flow video signal; fourth means for reading out the outward-flow video signal from the first recording medium as an output digital video signal; fifth means for extracting portions of the input digital video signal and combining the extracted portions into an inward-flow digest signal; sixth means for recording the inward-flow digest signal generated by the fifth means on the first recording medium; seventh means for transferring the inward-flow digest signal from the first recording medium to the second recording medium; eighth means for transferring the digest signal from the second recording medium to the first recording medium as an outward-flow digest signal; and ninth means for reading out the outward-flow digest signal from the first recording medium as an output digest signal.

A twenty-second aspect of this invention is based on the twenty-first aspect thereof, and provides a digital data recording and reproducing apparatus further comprising tenth means for deciding whether or not the second recording medium is newly placed in position, and eleventh means for, in cases where the tenth means decides that the second recording medium is newly placed in position, allowing the eighth means to transfer the digest signal from the second recording medium to the first recording medium.

A twenty-third aspect of this invention is based on the twenty-first aspect thereof, and provides a digital data recording and reproducing apparatus further comprising tenth means for recording a position marking signal on the second recording medium, the position marking signal representing positions of portions of the digital video signal on the second recording medium which correspond to the digest signal.

A twenty-fourth aspect of this invention is based on the twenty-third aspect thereof, and provides a digital data recording and reproducing apparatus further comprising eleventh means for deciding whether or not reproduction of the digital video signal is requested; twelfth means for, when the eleventh means decides that the reproduction of the digital video signal is requested, referring to the marking signal and allowing the third means to transfer the digital video signal from the second recording medium to the first recording medium in response to the marking signal; and thirteenth means for, when the eleventh means decides that the reproduction of the digital video signal is requested, allowing the fourth means to read out the outward-flow video signal from the first recording medium.

A twenty-fifth aspect of this invention is based on the twenty-fourth aspect thereof, and provides a digital data recording and reproducing apparatus wherein each of the portions of the digital video signal which are extracted by the fifth means corresponds to a given number of successive frames, and the twelfth means comprises means for starting the third means transferring the digital video signal from a portion temporally preceding a requested portion.

A twenty-sixth aspect of this invention is based on the twenty-fourth aspect thereof, and provides a digital data recording and reproducing apparatus wherein each of the portions of the digital video signal which are extracted by the fifth means corresponds to a given number of successive frames.

A twenty-seventh aspect of this invention is based on the twenty-sixth aspect thereof, and provides a digital data recording and reproducing apparatus wherein the input digital video signal represents a sequence of different programs, and the portions of the digital video signal which are extracted by the fifth means correspond to starting portions of the programs respectively.

A twenty-eighth aspect of this invention is based on the twenty-first aspect thereof, and provides a digital data recording and reproducing apparatus wherein the fourth means comprises means for periodically extracting first portions of the digital video signal at a predetermined period and arranging the extracted first portions into a first component of the digest signal, and means for extracting second portions of the digital video signal and arranging the extracted second portions into a second component of the digest signal, and wherein each of the second portions of the digital video signal corresponds to a given number of successive frames.

A twenty-ninth aspect of this invention is based on the twenty-eighth aspect thereof, and provides a digital data recording and reproducing apparatus further comprising tenth means for deciding whether or not reproduction of the digital video signal is requested; eleventh means for, when the tenth means decides that the reproduction of the digital video signal is requested, referring to the marking signal corresponding to the first portions of the digital video signal and allowing the third means to transfer the second portions of the digital video signal from the second recording medium to the first recording medium in response to the marking signal; thirteenth means for, when the tenth means decides that the reproduction of the digital video signal is requested, allowing the fourth means to read out the second portions of the digital video signal from the first recording medium; fourteenth means for, when the tenth means decides that the reproduction of the digital video signal is requested, allowing the third means to transfer the digital video signal from the second recording medium to the first recording medium after the third means transfers the second portions of the digital video signal from the second recording medium to the first recording medium; and fifteenth means for, when the tenth means decides that the reproduction of the digital video signal is requested, allowing the fourth means to read out the outward-flow video signal from the first recording medium after the fourth means reads out the second portions of the digital video signal from the first recording medium.

BRIEF DESCRIPTION OF THE DRAWINGS

FIG. 5 is a flowchart of a first segment of a control program for a CPU in FIG. 1.

DESCRIPTION OF THE PREFERRED EMBODIMENTS

First Embodiment

Figure 1:
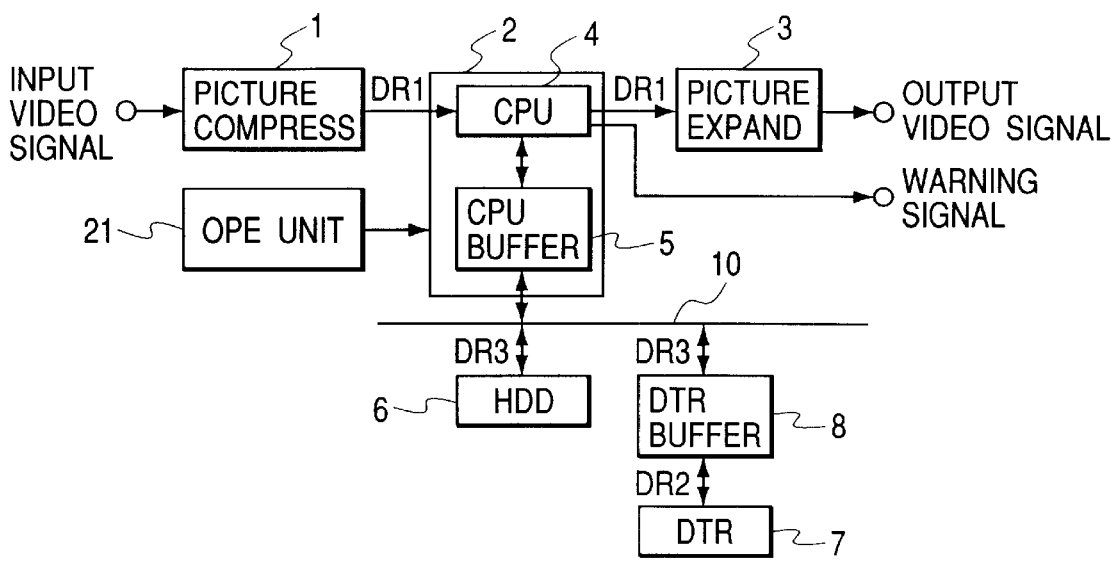
FIG. 1 is a block diagram of a video data recording and reproducing apparatus according to a first embodiment of this invention.

FIG. 1 shows an apparatus for recording and reproducing digital data representing video information. A monitoring video camera (not shown) outputs a video signal, which is digitized by an analog-to-digital converter (not shown) into a digital picture signal. The apparatus of FIG. 1 receives the digital picture signal from the analog-to-digital converter as an input digital video signal.

The apparatus of FIG. 1 includes a picture compressor 1, a controller 2, a picture expander 3, a hard disc drive (HDD) 6, a digital video tape recorder or a data tape recorder (DTR) 7, a DTR buffer 8, and an operation unit 21. The picture compressor 1, the picture expander 3, and the operation unit 21 are connected to the controller 2. The controller 2, the HDD 6, and the DTR buffer 8 are connected to each other via an interface bus 10 which conforms to, for example, the SCSI (Small Computer System Interface) 2 standards.

The controller 2 includes a combination of a CPU (central processing unit) 4 and a CPU buffer 5. The CPU buffer 5 has a RAM (random access memory).

The picture compressor 1 receives the input digital video signal. The picture compressor 1 compresses and encodes the input digital video signal into a compression-resultant digital video signal through given signal processing which conforms to the MPEG (Motion Picture Experts Group) standards. The picture compressor 1 outputs the compression-resultant digital video signal to the controller 2.

The operation unit 21 can be actuated by a user. The operation unit 21 outputs a command signal to the controller 2 when being actuated by the user. The output signal of the operation unit 21 can be changed among different command signals including a command signal for starting operation of the apparatus. Accordingly, operation of the apparatus can be started by actuating the operation unit 21.

During operation of the apparatus, the CPU 4 in the controller 2 feeds the compression-resultant digital video signal to the HDD 6 via the CPU buffer 5. The HDD 6 records the compression-resultant digital video signal on a first area of a magnetic disc. Also, the HDD 6 reproduces the compression-resultant digital video signal from the first area of the magnetic disc. The compression-resultant digital video signal reproduced by the HDD 6 is transmitted to the DTR 7 via the DTR buffer 8. The DTR 7 records the compression-resultant digital video signal on a magnetic tape.

During operation of the apparatus, the DTR 7 reproduces the compression-resultant digital video signal from the magnetic tape. The compression-resultant digital video signal reproduced by the DTR 7 is transmitted to the HDD 6 via the DTR buffer 8. The HDD 6 records the compression-resultant digital video signal, which is transmitted from the DTR 7, on a second area of the magnetic disc. The second area of the magnetic disc is separate from the first area thereof. The HDD 6 reproduces the compression-resultant digital video signal from the second area of the magnetic disc. The compression-resultant digital video signal reproduced by the HDD 6 is transmitted to the CPU 4 via the CPU buffer 5. The CPU 4 outputs the compression-resultant digital video signal, which is transmitted from the HDD 6, to the picture expander 3.

The picture expander 3 expands and decodes the compression-resultant digital video signal into an output digital video signal through given signal processing which is inverse with respect to the signal processing by the picture compressor 1. The output digital video signal corresponds to the input digital video signal. The picture expander 3 feeds the output digital video signal to a display (not shown). Pictures represented by the output digital video signals are indicated on the display.

The CPU 4 in the controller 2 includes a combination of an input/output port, a signal processing section, a ROM (read only memory), and a RAM (random access memory). The CPU 4 operates in accordance with a control program stored in the ROM. According to the control program, the CPU 4 controls the CPU buffer 5, the HDD 6, the DTR 7, and the DTR buffer 8.

Figure 2:
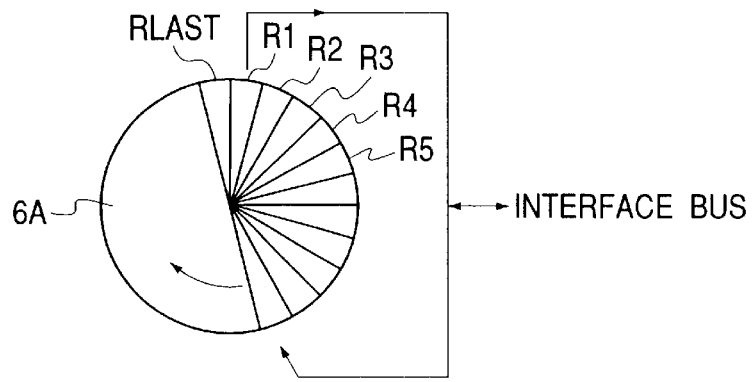
FIG. 2 is a diagram of a magnetic disc in a hard disc drive (HDD) in FIG. 1.

The HDD 6 receives the compression-resultant digital video signal from the CPU buffer 5 or the DTR buffer 8. The HDD 6 records the compression-resultant digital video signal on the magnetic disc. The HDD 6 reproduces the compression-resultant digital video signal from the magnetic disc. As shown in FIG. 2, the magnetic disc 6A in the HDD 6 has sector regions R1, R2, R3, . . . , RLAST. The compression-resultant digital video signal is successively recorded on the sector regions R1, R2, R3, . . . , RLAST. After the sector region RLAST has been fully loaded with the compression-resultant digital video signal, the sector region R1 starts to be accessed again. Thus, the recording of the compression-resultant digital video signal on the sector regions R1, R2, R3, . . . , RLAST can be endlessly continued. During the endlessly recording, in each of the sector regions R1, R2, R3, . . . , RLAST, the new compression-resultant digital video signal is written over the old compression-resultant digital video signal. During the reproduction of the compression-resultant digital video signal from the magnetic disc 6A, the sector regions R1, R2, R3, . . . , RLAST are successively accessed. During the reproduction of the compression-resultant digital video signal from the magnetic disc 6A, a set of the sector regions R1, R2, R3 may be accessed on a batch basis. The access time in the HDD 6 is shorter than the access time in the DTR 7. In other words, the HDD 6 more quickly accesses the magnetic disc than the access to the magnetic tape by the DTR 7. The recording area of the magnetic disc in the HDD 6 is divided into halves assigned to the compression-resultant digital video signal from the CPU buffer 5 and the compression-resultant digital video signal from the DTR buffer 8 respectively.

The DTR 7 records the compression-resultant digital video signal on the magnetic tape. The DTR 7 reproduces the compression-resultant digital video signal from the magnetic tape. The magnetic tape in the DTR 7 has a recording capacity greater than the recording capacity of the magnetic disc in the HDD 6. The DTR 7 conforms to the D-VHS standards. The data rate at which the DTR 7 implements the signal recording and the signal reproduction is equal to a predetermined value DR2, for example, 13.8 Mbps.

When the operation unit 21 is actuated by the user to start operation of the apparatus, the operation unit 21 outputs a start command signal to the controller 2. The controller 2 is programmed to start operation of the apparatus in response to the start command signal.

During operation of the apparatus, there are first and second signal flows in the apparatus. The first signal flow is an inward signal flow directed from the picture compressor 1 to the DTR 7 via the CPU 4, the CPU buffer 5, the HDD 6, and the DTR buffer 8. The second signal flow is an outward signal flow directed from the DTR 7 to the picture expander 3 via the DTR buffer 8, the HDD 6, the CPU buffer 5, and the CPU 4. The CPU buffer 5 is divided into two regions assigned to video signals in the inward flow and the outward flow respectively. The recording area of the magnetic disc in the HDD 6 is divided into two halves assigned to video signals in the inward flow and the outward flow respectively. The DTR buffer 8 is divided into two regions assigned to video signals in the inward flow and the outward flow respectively.

Figure 3:
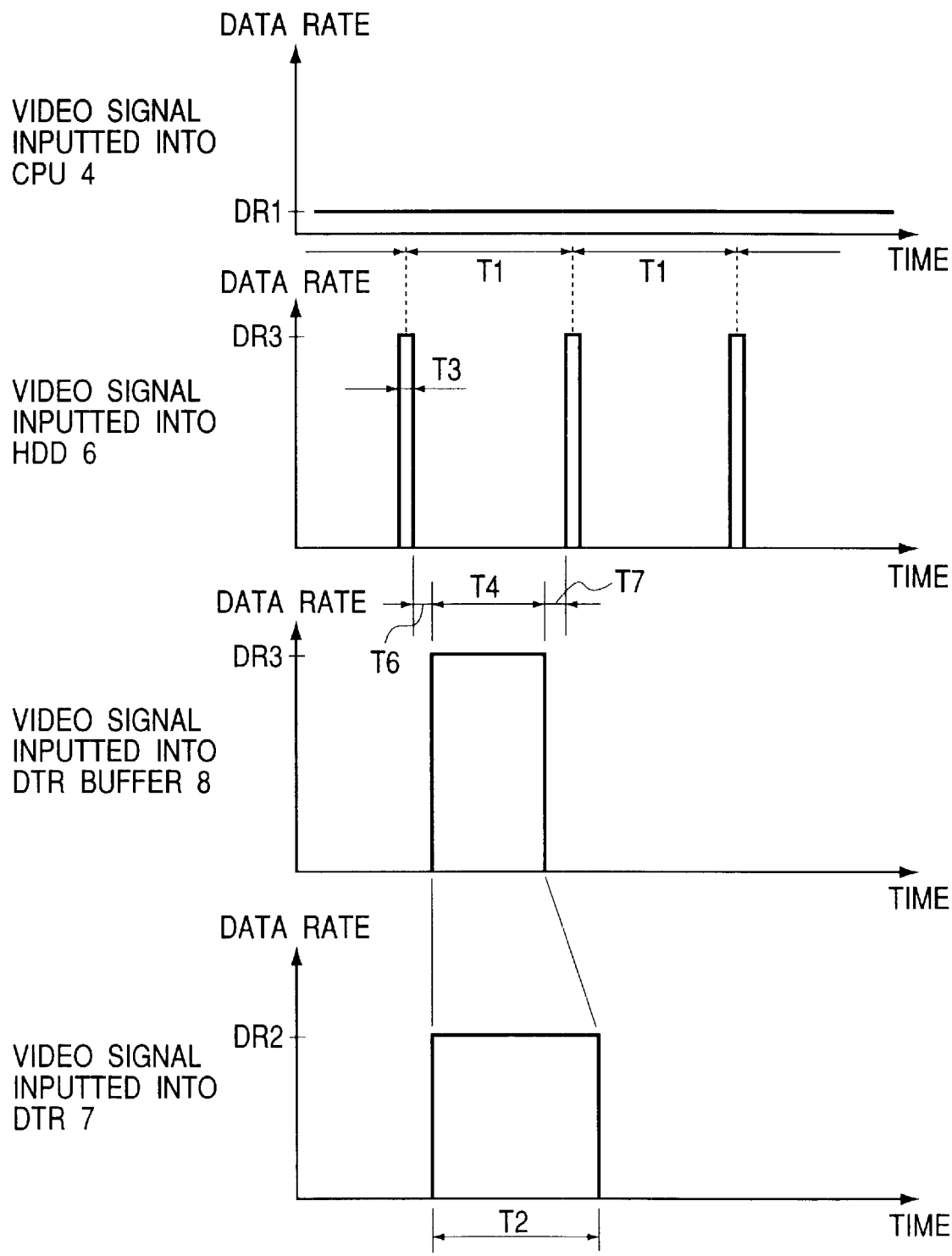
FIG. 3 is a time-domain diagram of signals in the apparatus of FIG. 1.

Operation of the apparatus which relates to the inward signal flow (the signal flow from the picture compressor 1 to the DTR 7) will be explained below. During operation of the apparatus, the picture compressor 1 processes the input digital video signal into the compression-resultant digital video signal. The picture compressor 1 outputs the compression-resultant digital video signal to the controller 2 at a predetermined data rate DR1 (equal to, for example, 1.38 Mbps) lower than the predetermined data rate DR2. Thus, as shown in FIG. 3, the compression-resultant digital video signal inputted into the CPU 4 in the controller 2 has the constant data rate DR1. The CPU 4 is programmed to periodically transmit the compression-resultant digital video signal to the HDD 6 via the CPU buffer 5 and the interface bus 10. The HDD 6 records the compression-resultant digital video signal on the magnetic disc. The CPU 4 is programmed to control the CPU buffer 5 so that the CPU buffer 5 will serve as a data-rate converter. Specifically, the CPU 4 writes the compression-resultant digital video signal into the CPU buffer 5 at a data rate equal to the predetermined data rate DR1. Each time the amount (the number of bits) of the compression-resultant digital video signal in the CPU buffer 5 increases to a predetermined amount DA1 (equal to, for example, 40 Mb), the CPU 4 controls the CPU buffer 5 so that the compression-resultant digital video signal will be transferred from the CPU buffer 5 to the HDD 6 at a predetermined data rate DR3 (for example, 20 Mbps) greater than the predetermined data rates DR1 and DR2. Thus, as shown in FIG. 3, the compression-resultant digital signal inputted into the HDD 6 intermittently occurs at a predetermined period T1. Regarding every occurrence, the compression-resultant digital video signal inputted into the HDD 6 lasts for a predetermined time interval T3 significantly shorter than the predetermined period T1. The CPU 4 enables the HDD 6 to intermittently record the compression-resultant digital video signal on the magnetic disc. The compression-resultant digital video signal transferred to the HDD 6 during every time interval T3 is referred to as a segment (a signal segment). The HDD 6 records the compression-resultant digital video signal on the magnetic disc segment by segment. The signal segments are assigned to the sector regions R1, R2, R3, . . . , RLAST of the magnetic disc, respectively.

Figure 4:
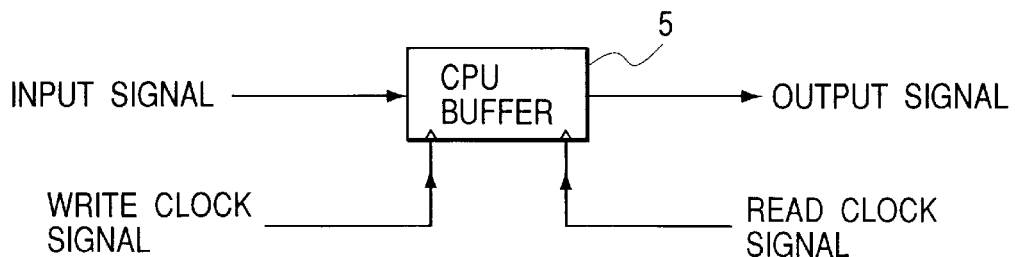
FIG. 4 is a diagram of a CPU buffer, and signals inputted into and outputted from the CPU buffer in FIG. 1.

During operation of the apparatus, the CPU buffer 5 is operated as a data-rate converter. As shown in FIG. 4, a write clock signal and a read clock signal are applied to the CPU buffer 5. The write clock signal and the read clock signal are generated by, for example, the CPU 4. The compression-resultant digital video signal is written into the CPU buffer 5 in response to the write clock signal. The write clock signal has a given frequency and a given period corresponding to the predetermined data rate DR1. The compression-resultant digital video signal is read out from the CPU buffer 5 in response to the read clock signal. The read clock signal has a given frequency and a given period corresponding to the predetermined data rate DR3.

During operation of the apparatus, each time the amount (the number of bits) of the compression-resultant digital video signal in the first area of the magnetic disc within the HDD 6 increases to a predetermined amount DA2, the CPU 4 controls the HDD 6 and the DTR buffer 8 so that the compression-resultant digital video signal will be transferred from the first area of the magnetic disc within the HDD 6 to the DTR buffer 8 at the predetermined data rate DR3. Thus, the compression-resultant digital video signal is written into the DTR buffer 8 at the predetermined data rate DR3. The predetermined amount DA2 is smaller than the recording capacity of the magnetic disc within the HDD 6. Preferably, the predetermined amount DA2 is equal to about a half of the recording capacity of the magnetic disc within the HDD 6. The compression-resultant digital video signal inputted into the DTR buffer 8 intermittently occurs at a predetermined period longer than the predetermined period T1. As shown in FIG. 3, regarding every occurrence, the compression-resultant digital video signal inputted into the DTR buffer 8 lasts for a predetermined time interval T4 which does not positionally overlap the time intervals T3 during which the compression-resultant digital video signal is transferred from the CPU buffer 5 to the HDD 6. Specifically, the time interval T4 follows a time interval T3 by a short time T6, and precedes a next time interval T3 by a short time T7. Each of the short times T6 and T7 contains a seek time spent by change of the HDD 6 between the signal recording state and the signal reproducing state. The seek time depends on a read address signal and a write address signal generated in the HDD 6. Preferably, the predetermined period T1 and the predetermined time interval T4 are chosen in view of the maximum value of the seek time. For example, the signal writing into the DTR buffer 8 for the time interval T4 is executed once while the signal writing into the magnetic disc within the HDD 6 is executed ten times.

During operation of the apparatus, the CPU 4 controls the DTR buffer 8 so that the DTR buffer 8 will serve as a data-rate converter. The data-rate-conversion control of the DTR buffer 8 by the CPU 4 is similar to the previously-mentioned data-rate-conversion control of the CPU buffer 5 by the CPU 4. Specifically, the CPU 4 controls the DTR buffer 8 so that the compression-resultant digital video signal fed from the HDD 6 will be written into the DTR buffer 8 at a data rate equal to the predetermined data rate DR3. The signal writing into the DTR buffer 8 is implemented for the predetermined time interval T4. In addition, the CPU 4 controls the DTR buffer 8 so that the compression-resultant digital video signal will be transferred from the DTR buffer 8 to the DTR 7 at the predetermined data rate DR2. The compression-resultant digital video signal inputted into the DTR 7 intermittently occurs at a predetermined period longer than the predetermined period T1. As shown in FIG. 3, since the predetermined data rate DR2 is smaller than the predetermined data rate DR3, every occurrence of the compression-resultant digital video signal inputted into the DTR 7 lasts for a predetermined time interval T2 longer than the predetermined time interval T4 during which the compression-resultant digital video signal is written into the DTR buffer 8. The value "DR2·T2" is equal to the value "DR3·T4". The CPU 4 enables the DTR 7 to intermittently record the compression-resultant digital video signal on the magnetic tape.

An example of the setting of the parameters DR1, DR2, DR3, T1, T2, T3, and T4 is as follows. The predetermined data rate DR1 is equal to 1.38 Mbps. The predetermined data rate DR2 is equal to 13.8 Mbps. The predetermined data rate DR3 is equal to 20 Mbps. The predetermined period T1 is equal to 29 seconds. The predetermined time interval T2 is equal to 29 seconds. The predetermined time interval T3 is equal to 2 seconds. The predetermined time interval T4 is equal to 20 seconds. Preferably, the capacity of the DTR buffer 8 is equal to or greater than the value "DR2·(T2−T4)", for example, 125 Mb.

FIG. 5 shows a first segment of the control program for the CPU 4. The program segment in FIG. 5 relates to the inward signal flow (the signal flow from the picture compressor 1 to the DTR 7). The program segment in FIG. 5 is periodically executed during operation of the apparatus.

As shown 5, a first step 101 of the program segment controls the CPU buffer 5 so that the compression-resultant digital video signal will be written thereinto at the predetermined data rate DR1.

A step 102 following the step 101 calculates the amount (the number of bits) of the compression-resultant digital video signal in the CPU buffer 5 on the basis of information of the signal writing into the CPU buffer 5 and information of the signal readout from the CPU buffer 5.

A step 103 subsequent to the step 102 compares the calculated amount of the compression-resultant digital video signal in the CPU buffer 5 with the predetermined amount DA1. When the calculated amount is equal to or greater than the predetermined amount DA1, the program advances from the step 103 to a step 104. When the calculated amount is smaller than the predetermined amount DA1, the program jumps from the step 103 to a step 106.

The step 104 controls the CPU buffer 5 so that the compression-resultant digital video signal will be transferred from the CPU buffer 5 to the HDD 6 at the predetermined data rate DR3 (for example, 20 Mbps).

A step 105 following the step 104 controls the HDD 6 so that the HDD 6 will record the compression-resultant digital video signal on the first area of the magnetic disc. After the step 105, the program advances to the step 106.

The step 106 calculates the amount (the number of bits) of the compression-resultant digital video signal in the first area of the magnetic disc within the HDD 6 on the basis of information of the signal writing into the first area of the magnetic disc and information of the signal readout from the first area of the magnetic disc.

A step 107 subsequent to the step 106 compares the calculated amount of the compression-resultant digital video signal in the first area of the magnetic disc with the predetermined amount DA2. When the calculated amount is equal to or greater than the predetermined amount DA2, the program advances from the step 107 to a step 108. When the calculated amount is smaller than the predetermined amount DA2, the program exits from the step 107 and then the current execution cycle of the program segment ends.

The step 108 controls the HDD 6 and the DTR buffer 8 so that the compression-resultant digital video signal will be transferred from the first area of the magnetic disc within the HDD 6 to the DTR buffer 8 at the predetermined data rate DR3.

A step 109 following the step 108 controls the DTR buffer 8 so that the compression-resultant digital video signal will be written thereinto at the predetermined data rate DR3.

A step 110 subsequent to the step 109 controls the DTR buffer 8 so that the compression-resultant digital video signal will be transferred from the DTR buffer 8 to the DTR 7 at the predetermined data rate DR2.

A step 111 following the step 110 controls the DTR 7 so that the DTR 7 will record the compression-resultant digital video signal on the magnetic tape. After the step 111, the current execution cycle of the program segment ends.

Figure 6:
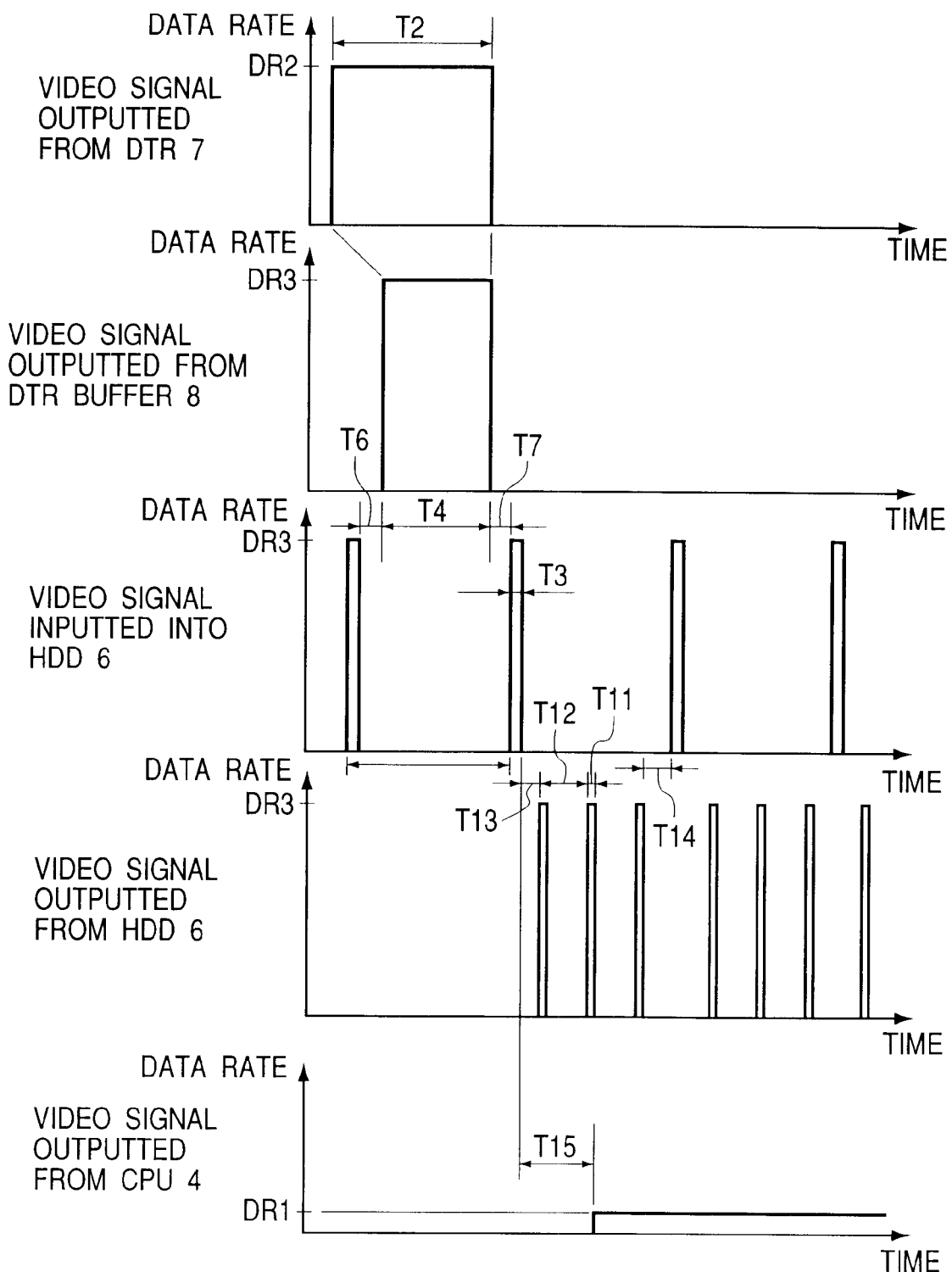
FIG. 6 is a time-domain diagram of signals in the apparatus of FIG. 1.

Operation of the apparatus which relates to the outward signal flow (the signal flow from the DTR 7 to the picture expander 3) will be explained below. During operation of the apparatus, the CPU 4 enables the DTR 7 to intermittently reproduce the compression-resultant digital video signal from the magnetic tape at the predetermined data rate DR2. The DTR 7 outputs the reproduced digital video signal to the DTR buffer 8 at the predetermined data rate DR2. As shown in FIG. 6, every occurrence of the compression-resultant digital video signal outputted from the DTR 7 lasts for a predetermined time interval T2. The CPU 4 controls the DTR buffer 8 so that the compression-resultant digital video signal will be written into the DTR buffer 8 at the predetermined data rate DR2. In addition, the CPU 4 controls the DTR buffer 8 so that the compression-resultant digital video signal will be intermittently transferred from the DTR buffer 8 to the HDD 6 at the predetermined data rate DR3. Thus, the DTR buffer 8 is operated as a data-rate converter. The CPU 4 enables the HDD 6 to intermittently record the compression-resultant digital video signal on the second area of the magnetic disc. As shown in FIG. 6, every occurrence of the compression-resultant digital video signal outputted from the DTR buffer 8 lasts for a predetermined time interval T4 shorter than the predetermined time interval T2. The time interval T4 of the outputting of the compression-resultant digital video signal from the DTR buffer 8 is positionally between two successive time intervals T3 during which the digital video signal in the inward flow is inputted into the HDD 6. Specifically, the time interval T4 follows a time interval T3 by a short time T6, and precedes a next time interval T3 by a short time T7.

During operation of the apparatus, the CPU 4 enables the HDD 6 to intermittently reproduce the compression-resultant digital video signal from the second area of the magnetic disc at the predetermined data rate DR3. The HDD 6 outputs the reproduced digital video signal to the CPU buffer 5 at the predetermined data rate DR3. As shown in FIG. 6, the compression-resultant digital video signal outputted from the HDD 6 intermittently occurs. Regarding every occurrence, the compression-resultant digital video signal outputted from the HDD 6 lasts for a predetermined time interval T11 shorter than the predetermined time interval T3. Three time intervals T11 of the outputting of the compression-resultant digital video signal from the HDD 6 are positionally between two successive time intervals T3 during which the digital video signal in the inward flow is inputted into the HDD 6. The three time intervals T11 are spaced at a predetermined period T12. First one of the three time intervals T11 follows a time interval T3 by a short time T13 while last one of the three time intervals T11 precedes a next time interval T3 by a short time T14. The CPU 4 controls the CPU buffer 5 so that the compression-resultant digital video signal will be rewritten into the CPU buffer 5 at the predetermined data rate DR3, and that the compression-resultant digital video signal will be read out from the CPU buffer 5 at the predetermined data rate DR1. Accordingly, the CPU buffer 5 is operated as a data-rate converter. The CPU 4 transfers the compression-resultant digital video signal from the CPU buffer 5 to the picture expander 3 at the predetermined data rate DR1. Thus, as shown in FIG. 6, the compression-resultant digital video signal outputted from the CPU 4 to the picture expander 3 has the constant data rate DR1. The compression-resultant digital video signal outputted from the CPU 4 to the picture expander 3 delays from the end of a corresponding time interval T3 by a time T15. The picture expander 3 expands and decodes the compression-resultant digital video signal into an output digital video signal. The output digital video signal corresponds to the input digital video signal. The picture expander 3 feeds the output digital video signal to the display. Pictures represented by the output digital video signals are indicated on the display.

During operation of the apparatus, the CPU 4 calculates the amount (the number of bits) of the compression-resultant digital video signal in the first area of the magnetic disc within the HDD 6. The CPU 4 compares the calculated amount with a predetermined amount DA3 corresponding to, for example, 80% of the first area of the magnetic disc. When the calculated amount reaches the predetermined amount DA3, the CPU 4 outputs a warning signal to the display. The warning signal is indicated on the display. Generally, the warning signal and the output digital video signal are multiplexed by a suitable device (not shown) before being indicated on the display. The CPU 4 may output the warning signal to a loudspeaker. In this case, the warning signal is converted by the loudspeaker into a corresponding sound.

Figure 7:
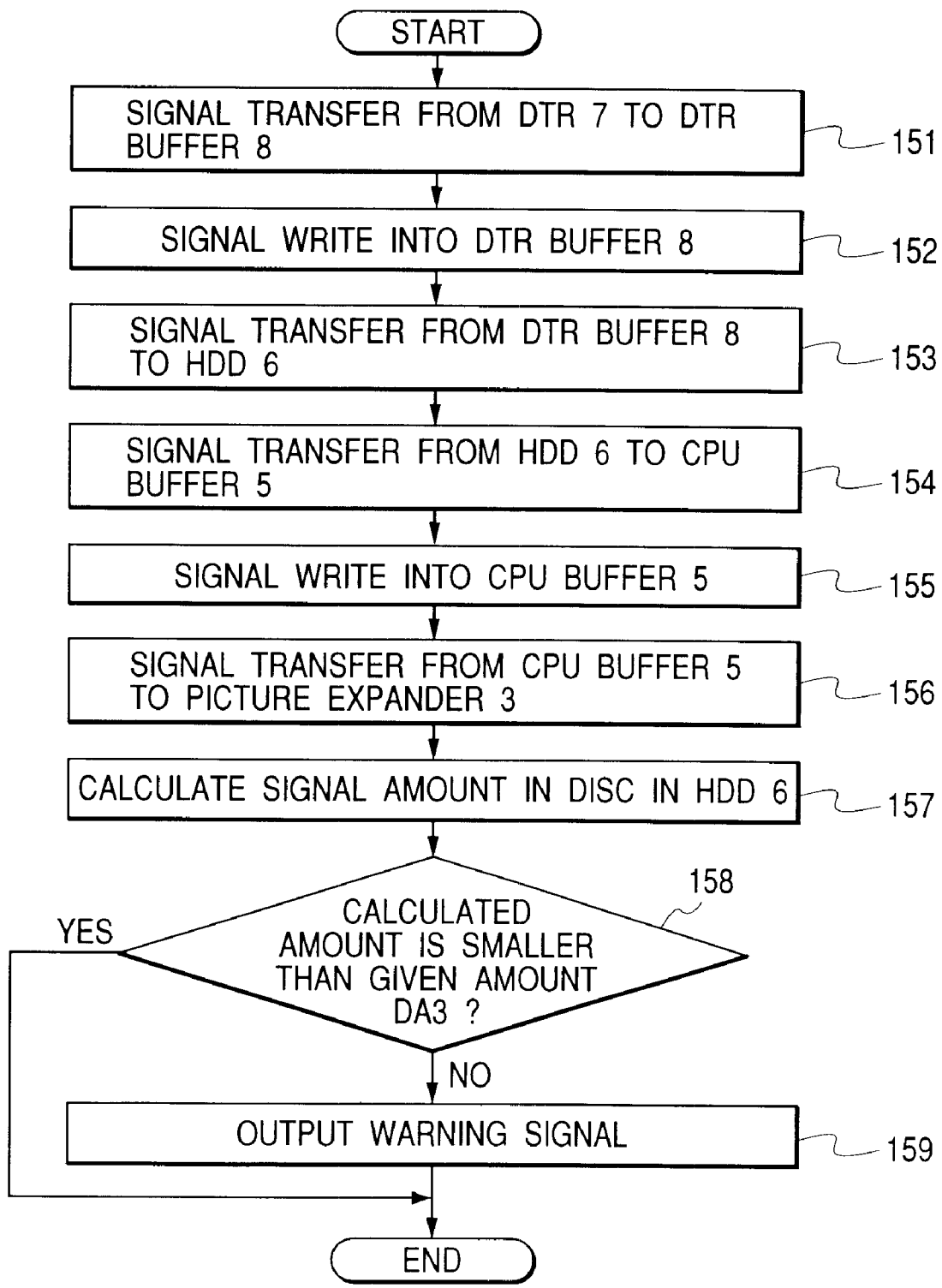
FIG. 7 is a flowchart of a second segment of the control program for the CPU in FIG. 1.

FIG. 7 shows a second segment of the control program for the CPU 4. The program segment in FIG. 7 relates to the outward signal flow (the signal flow from the DTR 7 to the picture expander 3). The program segment in FIG. 7 is periodically executed during operation of the apparatus. The execution of the program segment in FIG. 7 and the execution of the program segment in FIG. 5 are on a time sharing basis. It should be noted that the illustrations of steps for the adjustment of timings of control procedures are omitted from FIG. 7 for clarity.

As shown in FIG. 7, a first step 151 of the program segment controls the DTR 7 so that the compression-resultant digital video signal will be reproduced from the magnetic tape in the DTR 7, and that the reproduced digital video signal will be outputted from the DTR 7 to the DTR buffer 8 at the predetermined data rate DR2.

A step 152 following the step 151 controls the DTR buffer 8 so that the compression-resultant digital video signal will be written into the DTR buffer 8 at the predetermined data rate DR2.

A step 153 subsequent to the step 152 controls the DTR buffer 8 and the HDD 6 so that the compression-resultant digital video signal will be transferred from the DTR buffer 8 to the second area of the magnetic disc within the HDD 6 at the predetermined data rate DR3.

A step 154 following the step 153 controls the HDD 6 so that the compression-resultant digital video signal will be reproduced from the second area of the magnetic disc within the HDD 6, and that the compression-resultant digital video signal will be transferred from the HDD 6 to the CPU buffer 5 at the predetermined data rate DR3.

A step 155 subsequent to the step 154 controls the CPU buffer 5 so that the compression-resultant digital video signal will be written into the CPU buffer 5 at the predetermined data rate DR3.

A step 156 following the step 155 transfers the compression-resultant digital video signal from the CPU buffer 5 to the picture expander 3 at the predetermined data rate DR1.

A step 157 subsequent to the step 156 calculates the amount (the number of bits) of the compression-resultant digital video signal in the first area of the magnetic disc within the HDD 6 on the basis of information of the signal writing into the first area of the magnetic disc and information of the signal readout from the first area of the magnetic disc.

A step 158 following the step 157 compares the calculated amount of the compression-resultant digital video signal in the first area of the magnetic disc with the predetermined amount DA3. When the calculated amount is equal to or greater than the predetermined amount DA3, the program advances from the step 158 to a step 159. When the calculated amount is smaller than the predetermined amount DA3, the program exits from the step 158 and then the current execution cycle of the program segment ends.

The step 159 outputs the warning signal to the display. After the step 159, the current execution cycle of the program segment ends.

Operation of the apparatus can be changed between a recording-playback mode and an exclusive recording mode by actuating the operation unit 21. During the recording-playback mode of operation of the apparatus, both the execution of the program segment in FIG. 5 and the execution of the program segment in FIG. 7 are permitted. Thus, during the recording-playback mode of operation of the apparatus, both the signal recording and the signal playback by the DTR 7 are implemented. During the exclusive recording mode of operation of the apparatus, the execution of the program segment in FIG. 5 is permitted while the execution of the program segment in FIG. 7 is inhibited. Thus, during the exclusive recording mode of operation of the apparatus, the signal recording by the DTR 7 is implemented while the signal playback by the DTR 7 is suspended.

Second Embodiment

A second embodiment of this invention is similar to the first embodiment thereof except for the following design change. In the second embodiment of this invention, the CPU 4 combines and multiplexes the compression-resultant digital video signal from the picture compressor 1 and the compression-resultant digital video signal from the CPU buffer 5 into a composite compression-resultant digital video signal. The CPU 4 outputs the composite compression-resultant digital video signal to the picture expander 3. The composite compression-resultant digital video signal is designed so that pictures represented by the compression-resultant digital video signal from the picture compressor 1 will be indicated on a first region of the screen of the display, and that pictures represented by the compression-resultant digital video signal from the CPU buffer 5 will be indicated on a second region of the screen of the display which separates from the first region thereof.

Third Embodiment

A third embodiment of this invention is similar to the second embodiment thereof except for the following design change. In the third embodiment of this invention, the CPU 4 selects one of first, second, and third indication modes in response to user's request inputted via the operation unit 21.

When the first indication mode is selected, only pictures represented by the compression-resultant digital video signal from the picture compressor 1 are indicated on the display. When the second indication mode is selected, only pictures represented by the compression-resultant digital video signal from the CPU buffer 5 are indicated on the display. When the third indication mode is selected, pictures represented by the compression-resultant digital video signal from the picture compressor 1 and also pictures represented by the compression-resultant digital video signal from the CPU buffer 5 are indicated on the display.

Fourth Embodiment

A fourth embodiment of this invention is similar to the first embodiment thereof except for the following design changes. In the fourth embodiment of this invention, as shown in FIG. 8, the signal writing into the DTR buffer 8 for the time interval T4 is executed twice while the signal writing into the magnetic disc within the HDD 6 is executed twenty times.

Figure 8:
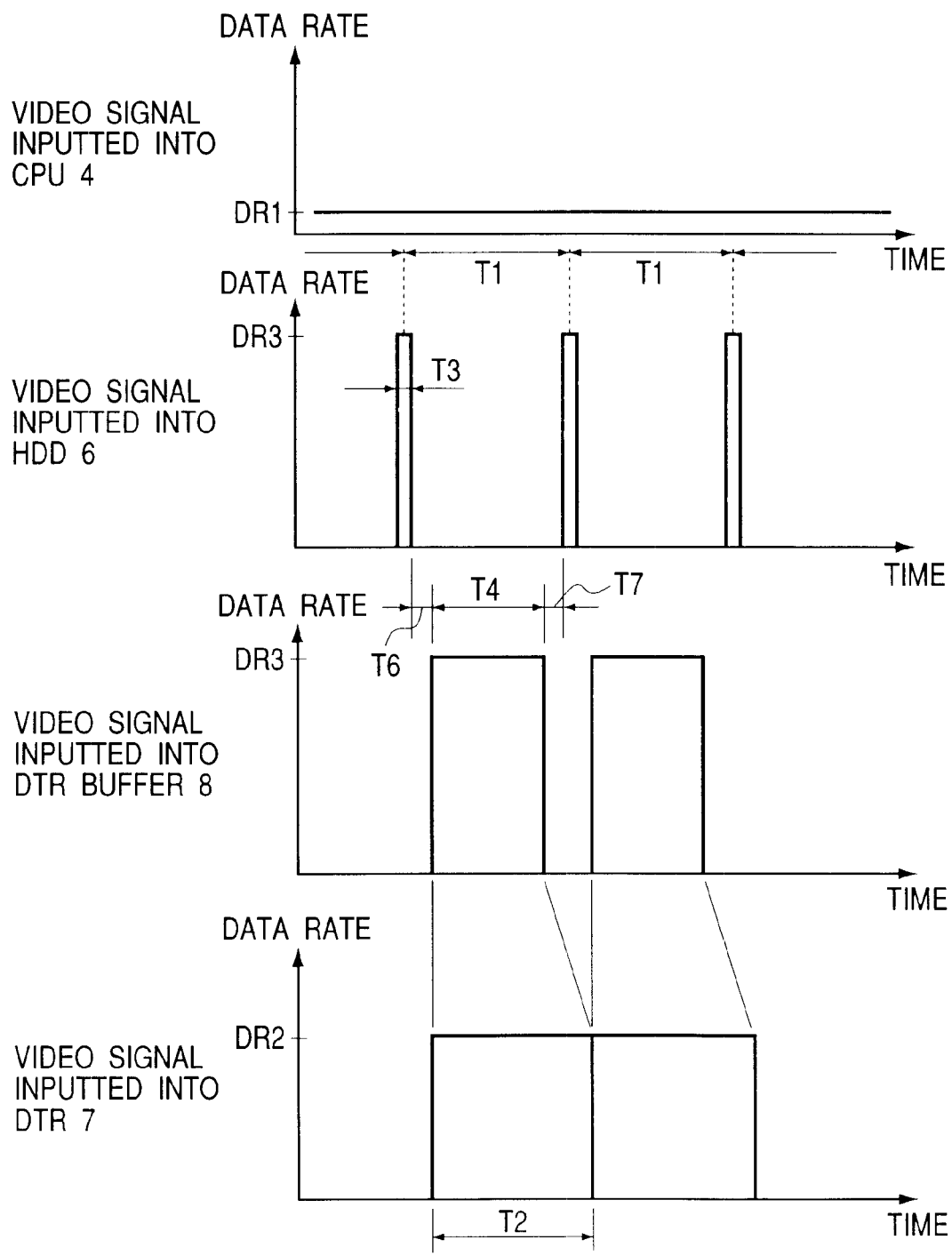
FIG. 8 is a time-domain diagram of signals in a video data recording and reproducing apparatus according to a fourth embodiment of this invention.

In the case where the time interval T4 is set so that the time interval T2 will be equal to the predetermined period T1, the compression-resultant digital video signal continues to be transferred to the DTR 7 from the DTR buffer 8 during twice the time interval T2 as shown in FIG. 8.

Fifth Embodiment

Figure 9:
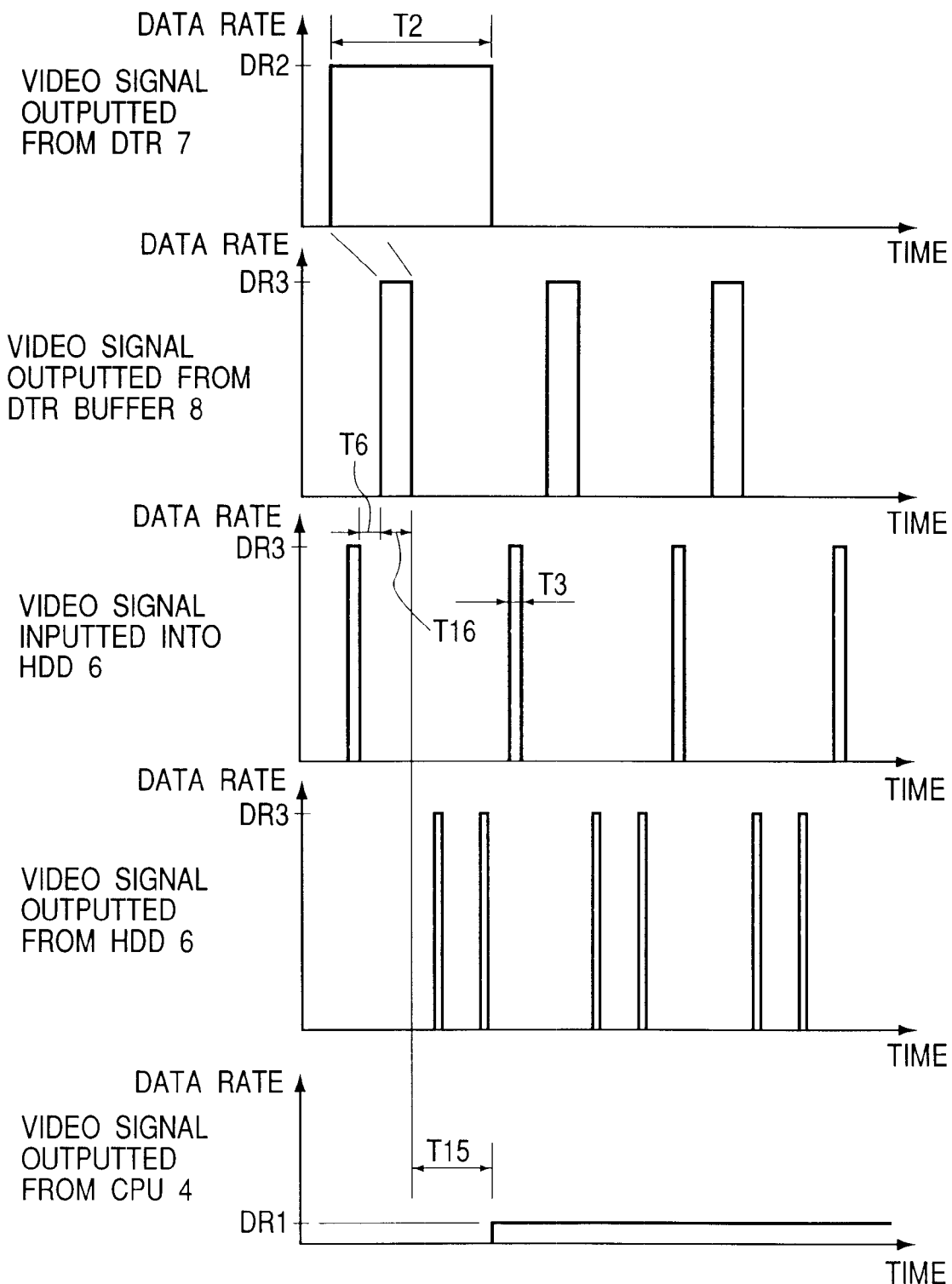
FIG. 9 is a time-domain diagram of signals in a video data recording and reproducing apparatus according to a fifth embodiment of this invention.

A fifth embodiment of this invention is similar to the first embodiment thereof except for the following design changes. In the fifth embodiment of this invention, as shown in FIG. 9, the compression-resultant digital video signal outputted from the DTR buffer 8 to the HDD 6 periodically occurs three times with respect to the compression-resultant digital video signal outputted from the DTR 7 to the DTR buffer 8 which lasts for the predetermined time interval T2. Regarding every occurrence, the compression-resultant digital video signal outputted from the DTR buffer 8 to the HDD 6 lasts for a predetermined time interval T16. Thus, every occurrence of the compression-resultant digital video signal outputted from the DTR 7 to the DTR buffer 8 is divided into three occurrences of the compression-resultant digital video signal outputted from the DTR buffer 8 to the HDD 6. The compression-resultant digital video signal outputted from the CPU 4 to the picture expander 3 delays from the end of the first occurrence of the compression-resultant digital video signal outputted from the DTR buffer 8 to the HDD 6 by a time T15.

As shown in FIG. 9, two time intervals of the outputting of the compression-resultant digital video signal from the HDD 6 to the CPU buffer 5 are positionally between two successive time intervals T3 during which the digital video signal in the inward flow is inputted into the HDD 6.

Sixth Embodiment

A sixth embodiment of this invention is similar to the first embodiment thereof except for the following design change. According to the sixth embodiment of this invention, in response to user's request inputted via the operation unit 21, the CPU 4 inhibits the compression-resultant digital video signal in the second area of the magnetic disc within the HDD 6 from being updated. In this case, the same compression-resultant digital video signal is iteratively transferred from the second area of the magnetic disc within the HDD 6 to the CPU buffer 5. Thus, in this case, a desired still picture continues to be indicated on the display, or a sequence of desired pictures is iteratively indicated on the display.

Seventh Embodiment

A seventh embodiment of this invention is similar to the first embodiment thereof except for design changes explained hereinafter. In the seventh embodiment, the CPU 4 is programmed to implement a RAW (read after write) function.

In the seventh embodiment of this invention, the DTR 7 records the compression-resultant digital video signal on the magnetic tape for about 3 minutes, and then the DTR 7 does not execute the signal recording for 27 minutes. The DTR 7 iterates these processes. The 3-minute digital video signal recorded by the DTR 7 corresponds to a 30-minute segment of the compression-resultant digital video signal outputted from the picture compressor 1 to the controller 2.

Figure 10:
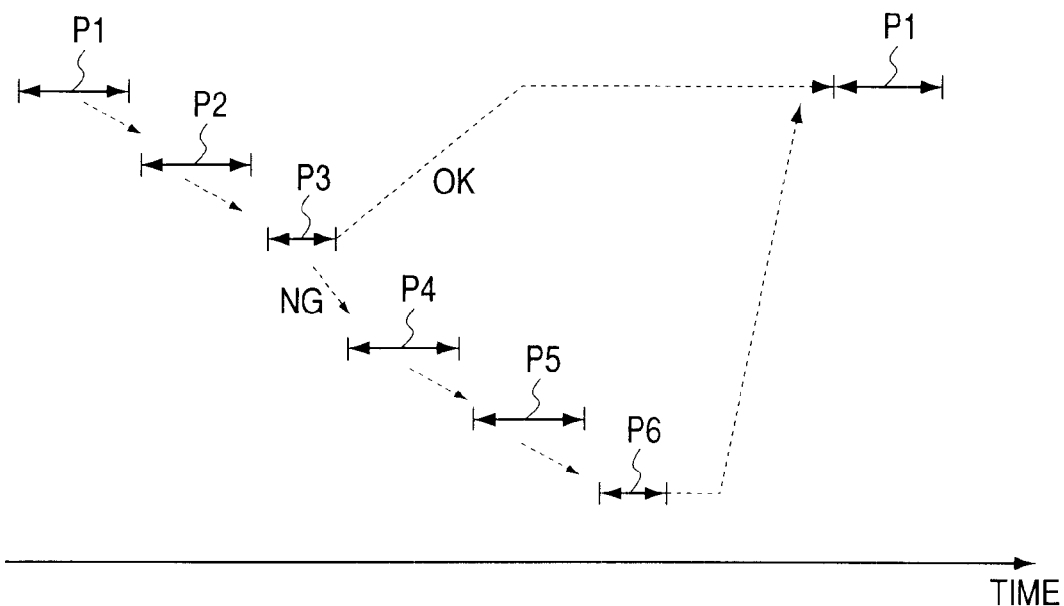
FIG. 10 is a time-domain diagram of signal processing stages in a video data recording and reproducing apparatus according to a seventh embodiment of this invention.
Figure 11:
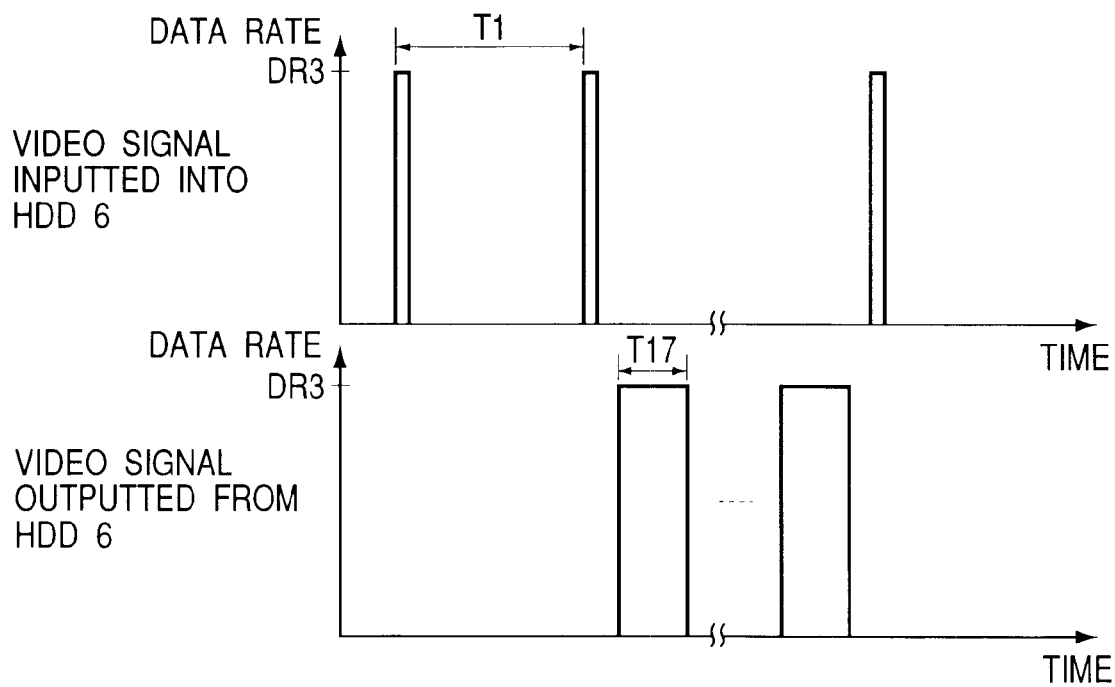
FIG. 11 is a time-domain diagram of signals in the apparatus according to the seventh embodiment of this invention.

In the seventh embodiment of this invention, the CPU 4 is programmed to implement the following processes. With reference to FIG. 10, during a first stage P1 corresponding to about 3 minutes, the DTR 7 records the compression-resultant digital video signal on the magnetic tape. During a stage P2 following the stage P1, the DTR 7 reproduces the compression-resultant digital video signal from the magnetic tape. The reproduced digital video signal (referred to as the first reproduced digital video signal) is transmitted from the DTR 7 to the HDD 6. The HDD 6 writes the first reproduced digital video signal into the second area of the magnetic disc. The HDD 6 reads out the compression-resultant digital video signal from the first area of the magnetic disc which corresponds to the first reproduced digital video signal. The readout digital video signal is referred to as the second reproduced digital video signal. During a time interval T17 in FIG. 11, the second reproduced digital video signal is transmitted from the HDD 6 to the CPU 4 via the CPU buffer 5. In addition, the first reproduced digital video signal is transmitted from the HDD 6 to the CPU 4 via the CPU buffer 5.

With reference to FIG. 10, during a stage P3 following the stage P2, the CPU 4 collates the first reproduced digital video signal and the second reproduced digital video signal with each other to decide whether or not the corresponding compression-resultant digital video signal has been accurately recorded on the magnetic tape in the DTR 7. Thus, a decision is made regarding whether the compression-resultant digital video signal reproduced from the magnetic tape by the DTR 7 is correct or wrong. In the case where the first reproduced digital video signal and the second reproduced digital video signal are equal in contents to each other, that is, in the case where the corresponding compression-resultant digital video signal has been accurately recorded on the magnetic tape in the DTR 7, a change to a suspended state is implemented and a first stage P1 in a next cycle is waited. During the first stage P1 in the next cycle, the DTR 7 records the compression-resultant digital video signal on the magnetic tape. On the other hand, in the case where the first reproduced digital video signal and the second reproduced digital video signal are different in contents from each other, that is, in the case where the corresponding compression-resultant digital video signal has not been accurately recorded on the magnetic tape in the DTR 7, the stage P3 is followed by a stage P4 during which the DTR 7 records the compression-resultant digital video signal of interest on the magnetic tape again. In this case, the recorded position on the magnetic tape may differ from the previous recorded position. During a stage P5 following the stage P4, signal reproduction and signal transfer are implemented as in the stage P2. During a stage P6 following the stage P5, signal collation is implemented as in the stage P3. The stage P6 is followed by the first stage P1 in the next cycle during which the DTR 7 records the compression-resultant digital video signal on the magnetic tape. As long as the compression-resultant digital video signal reproduced from the magnetic tape by the DTR 7 remains wrong, the above-mentioned sequence of the processes in the stage P4, P5, and P6 continues to be periodically repeated.

The DTR 7 may of the known type having an error correcting function. In this case, the processes implemented during the stages P2, P3, P4, P5, and P6 can be omitted.

Preferably, the predetermined data rate DR2 is greater than twice the predetermined data rate DR1. More preferably, the predetermined data rate DR2 is greater than three times the predetermined data rate DR1.

Eighth Embodiment

An eighth embodiment of this invention is similar to the first embodiment thereof except for design changes explained hereinafter. In the eighth embodiment, the CPU 4 is programmed to enable a search for a desired picture.

In the eighth embodiment, the CPU 4 is programmed to extract portions from the output signal of the picture compressor 1, and to generate information pieces related to the extracted portions and to combine the extracted portions and the generated information pieces into a digest digital video signal. The extraction of the portions from the output signal of the picture compressor 1 means thinning the output signal of the picture compressor 1. The digest digital video signal and the compression-resultant digital video signal are transmitted to the DTR 7 via the CPU buffer 5, the HDD 6, and the DTR buffer 8 before being recorded on the magnetic tape by the DTR 7. During a search mode of operation of the apparatus, the digest digital video signal is reproduced from the magnetic tape by the DTR 7, and the reproduced digest digital video signal is written into the magnetic disc (the recording medium) by the HDD 6. The digest digital video signal on the magnetic disc in the HDD 6 is accessed to indicate pictures on the display which are represented by the digest digital video signal. Thereby, a search for a desired picture is implemented. Pictures represented by the digest digital video signal are referred to as digest pictures.

Figure 12:
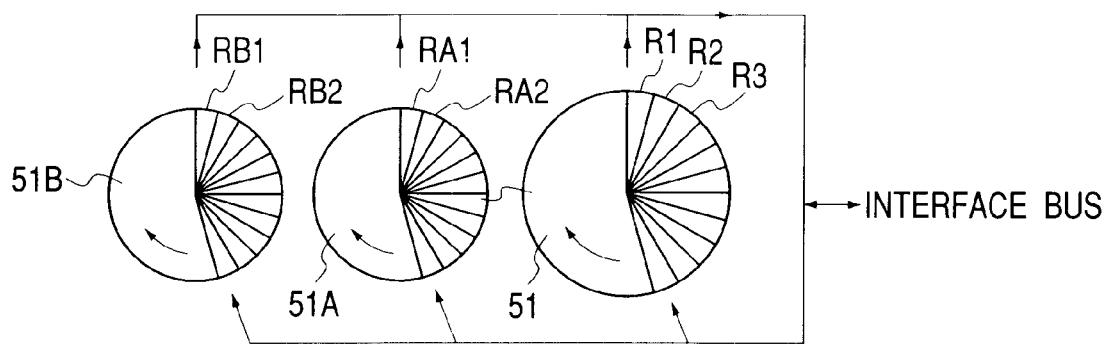
FIG. 12 is a diagram of a recording medium in a hard disc drive (HDD) in a video data recording and reproducing apparatus according to an eighth embodiment of this invention.

With reference to FIG. 12, the recording medium (the magnetic disc) in the HDD 6 has three main recording areas 51, 51A, and 51B. The recording area 51 is assigned to the compression-resultant digital video signal in the inward flow and the compression-resultant digital video signal in the outward flow. The recording area 51A is assigned to the digest digital video signal in the inward flow. The recording area 51B is assigned to the digest digital video signal in the outward flow. The recording area 51 is composed of sector regions R1, R2, R3, . . . The recording area 51A is composed of sector regions RA1, RA2, . . . The recording area 51B is composed of sector regions RB1, RB2, . . . The size of each of the recording areas 51A and 51B is chosen to correspond to at least the total amount of the digest digital video signal on the magnetic tape in the DTR 7. The writing of the digest digital video signal into the recording medium (the magnetic disc) within the HDD 6 and the writing of the corresponding compression-resultant digital video signal into the recording medium within the HDD 6 are implemented at similar timings or approximately equal timings.

Figure 13:
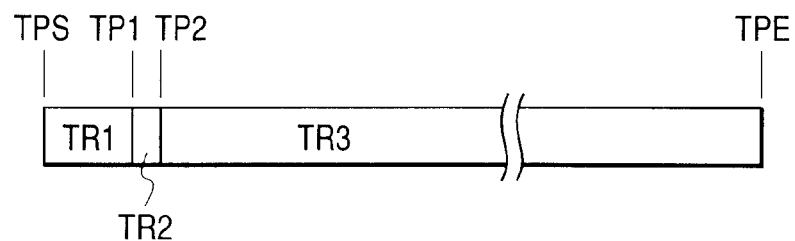
FIG. 13 is a diagram of regions of an effective recording area of a magnetic tape in the apparatus according to the eighth embodiment of this invention.

With reference to FIG. 13, the effective recording area of the magnetic tape in the DTR 7 is divided into three regions TR1, TR2, and TR3. The first region TR1 extends from the starting edge TPS of the effective recording area of the magnetic tape to a first intermediate point TP1. The first region TR1 is assigned to the digest digital video signal. The second region TR2 extends from the first intermediate point TP1 to a second intermediate point TP2. The second region TR2 is used as a non-recording region or a signal-less region on which any signal is not recorded. The third region TR3 extends from the second intermediate point TP2 to the ending edge TPE of the effective recording area of the magnetic tape. The third region TR3 is assigned to the compression-resultant digital video signal.

In respect of the recording of the compression-resultant digital video signal on the magnetic tape by the DTR 7, the CPU 4 is programmed to control the DTR 7 so that the recording on the magnetic tape will be started from the intermediate point TP2.

According to a modified structure, the recording of the compression-resultant digital video signal on the magnetic tape starts from the starting edge TPS of the effective recording area of the magnetic tape. When user's request for ejecting the magnetic tape from the DTR 7 is inputted via the operation unit 21, the digest digital video signal starts to be recorded on a region of the magnetic tape which follows the region loaded with the compression-resultant digital video signal.

Figure 14:
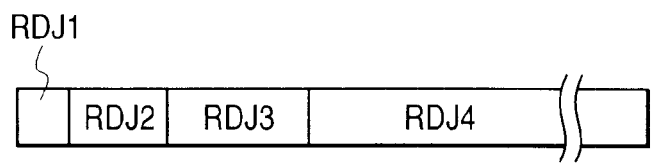
FIG. 14 is a diagram of one unit of a digest digital video signal in the apparatus according to the eighth embodiment of this invention.

The digest digital video signal has a string of units (frames). With reference to FIG. 14, each unit of the digest digital video signal has a sequence of portions RDJ1, RDJ2, RDJ3, and RDJ4. The first portion RDJ1 contains an identification data piece representing that a data piece stored in the fourth portion RDJ4 relates to the digest digital video signal. The second portion RDJ2 contains an information piece NRP of a position on the magnetic tape at which the compression-resultant digital video signal representative of a picture corresponding to the present digest picture is recorded. The third portion RDJ3 contains an information piece of the recording date and time. The fourth portion RDJ4 stores the main component of the digest digital video signal, that is, the portion extracted from the compression-resultant digital video signal.

The DTR 7 is of the known type provided with a video index search system (VISS) prescribed by the VHS standards. Accordingly, the recording position information piece NRP indicates the position corresponding to the NRP-th VISS ID (identification) signal which is numbered in the direction from the starting edge TPS of the magnetic tape.

Figure 15:
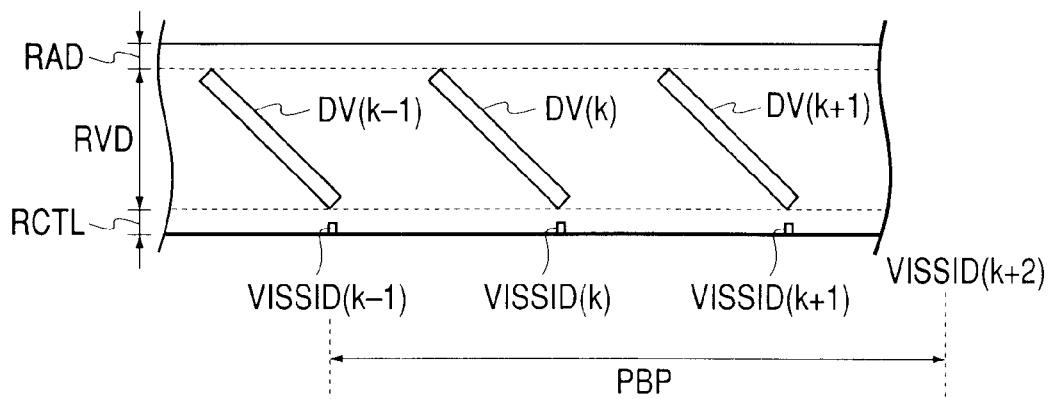
FIG. 15 is a diagram of the magnetic tape, segments of a VISS ID signal recorded thereon, and segments DV(k−1), DV(k), DV(k+1) of a compression-resultant digital video signal recorded thereon in the apparatus according to the eighth embodiment of this invention.

With reference to FIG. 15, the VISS ID signal is composed of marking signals VISSID(1), VISSID(2), . . . recorded on a control signal region RCTL of the magnetic tape which is loaded with a control signal. The recorded marking signals VISSID(1), VISSID(2), . . . are spaced at a predetermined interval. The absolute address (the absolute position) on the magnetic tape can be identified or detected by counting the marking signals VISSID(1), VISSID(2), from the starting edge TPS of the magnetic tape. A relative address (a relative position) on the magnetic tape with respect to an arbitrary position can be identified or detected by counting the marking signals from the arbitrary position. By referring to the VISS ID signal, a designated position on the magnetic tape can be accessed at a speed equal to the normal access speed multiplied by a factor of 100 to 200.

The recording position information piece NRP represents the order number of a marking signal which is numbered in the direction from the starting edge TPS of the magnetic tape. In the case of the signal recording on the magnetic tape which does not have any previously-recorded signal, the recording position information piece NRP is set to "1" at a start of the signal recording. Then, th e order number represented by the recording position information piece NRP is periodically incremented one by one. In the case of the signal recording on the magnetic tape which has a previously-recorded signal, the digest digital video signal is reproduced from the magnetic tape, and the maximum order number represented by the recording position information piece NRP is detected. The recording position information piece NRP is set to "1" plus the maximum order number at a start of the signal recording. Then, the order number represented by the recording position information piece NRP is periodically incremented one by one.

With reference to FIG. 15, the magnetic tape has a region RAD on which a linear audio signal is record ed. Also, the magnetic tape has a region RVD on which the compression-resultant digital video signal and a digital audio signal are recorded. The recorded marking signals VISSID(1), VISSID(2), . . . positionally agree with the components DV(1), DV(2), . . . of the recorded compression-resultant digital video signal which correspond to the digest digital video signal.

The CPU 4 is programmed to iteratively extract a 1-frame-corresponding portion from the output signal of the picture compressor 1 at a predetermined period. The extracted 1-frame-corresponding portion of the output signal of the picture compressor 1 is placed in the fourth portion RDJ4 in the present unit of the digest digital video signal. The CPU 4 generates additional information pieces, and places the additional information pieces in the first, second, and third portions RDJ1, RDJ2, and RDJ3 in the present unit of the digest digital video signal. In this way, the CPU 4 makes the present unit of the digest digital video signal.

The DTR 7 iteratively implements the signal recording at a period of 29 seconds. Preferably, the period of the extraction of a 1-frame-corresponding portion from the output signal of the picture compressor 1 by the CPU 4 is set to equal to the period of the signal recording by the DTR 7. In this case, as shown in FIG. 15, the components DV(k−1), DV(k), DV(k+1) of the recorded compression-resultant digital video signal which correspond to the digest digital video signal are spaced at a predetermined interval equal to 29 seconds.

When user's request for ejecting the magnetic tape from the DTR 7 is inputted via the operation unit 21, the CPU 4 controls the HDD 6 and the DTR 7 so that the digest digital video signal will be transferred from the recording area 51A of the recording medium in the HDD 6 to the first region TR1 of the magnetic tape in the DTR 7. Specifically, the HDD 6 reads out the digest digital video signal from the recording area 51A of the recording medium. The readout digest digital video signal is transmitted from the HDD 6 to the DTR 7 via the DTR buffer 8. The DTR 7 records the digest digital video signal on the first region TR1 of the magnetic tape. After the recording of the digest digital video signal on the first region TR1 of the magnetic tape is completed, the magnetic tape is ejected from the DTR 7.

According to an alternative design, when the compression-resultant digital video signal has been recorded on the magnetic tape up to the ending edge TPE, the transfer of the digest digital video signal from the recording area 51A of the recording medium in the HDD 6 to the first region TR1 of the magnetic tape in the DTR 7 is implemented.

A broadcasting digital video signal sequentially representing different programs may be used as the input digital video signal fed to the picture compressor 1. In this case, for each of the programs, a portion representing plural successive frames (for example, a starting 5-minute portion) is extracted from the output signal of the picture compressor 1. The extracted portions are used as main components of the digest digital video signal.

The apparatus may be connected with an ultrasonic sensor for detecting an intruder in a monitored place. In this case, when the ultrasonic sensor detects an intruder in the monitored place, the CPU 4 extracts a portion from the output signal of the picture compressor 1 as a main component of the digest digital video signal. Preferably, the extracted portion represents plural successive frames and corresponds to a time interval of, for example, 5 minutes.

The main components of the digest digital video signal may contain 1-frame-corresponding signal portions and also signal portions each representing plural successive frames.

The CPU 4 is programmed to implement the following sequence of processes related to the recording of the digest digital video signal. The CPU 4 extracts a portion from the output signal of the picture compressor 1. The CPU 4 generates additional information pieces related to the extracted signal portion. The CPU combines the extracted signal portion and the additional information pieces into the digest digital video signal. The digest digital video signal is transmitted from the CPU 4 to the HDD 6 via the CPU buffer 5. In addition, the compression-resultant digital video signal is transmitted from the CPU 4 to the HDD 6 via the CPU buffer 5. The CPU 4 controls the HDD 6 so that the HDD 6 will record the digest digital video signal and the compression-resultant digital video signal on the recording area 51A and the recording area 51 of the recording medium, respectively.

Subsequently, the CPU 4 controls the HDD 6 so that the HDD 6 will read out the compression-resultant digital video signal from the recording area 51 of the recording medium. The readout compression-resultant digital video signal is transmitted from the HDD 6 to the DTR 7 via the DTR buffer 8. The CPU 4 controls the DTR 7 so that the DTR 7 will record the compression-resultant digital video signal on the third region TR3 of the magnetic tape.

Immediately before the magnetic tape is ejected from the DTR 7 or when the compression-resultant digital video signal has been recorded on the magnetic tape up to the ending edge TPE, the CPU 4 controls the HDD 6 so that the HDD 6 will read out the digest digital video signal from the recording area 51A of the recording medium. The readout digest digital video signal is transmitted from the HDD 6 to the DTR 7 via the DTR buffer 8. The CPU 4 controls the DTR 7 so that the DTR 7 will record the digest digital video signal on the first region TR1 of the magnetic tape.

The CPU 4 is programmed to implement the following sequence of processes related to the reproduction of the digest digital video signal and the compression-resultant digital video signal in the case where the digest digital video signal results from the periodically thinning process and has 1-frame-corresponding portions rather than portions each representing plural successive frames. When the magnetic tape is placed in the DTR 7, the CPU 4 controls the DTR 7 so that the DTR 7 will reproduce the digest digital video signal from the first region TR1 of the magnetic tape. The reproduced digest digital video signal is transmitted from the DTR 7 to the HDD 6 via the DTR buffer 8. The CPU 4 controls the HDD 6 so that the HDD 6 will write the reproduced digest digital video signal into the recording area 51B of the recording medium.

Subsequently, the CPU 4 controls the HDD 6 so that the HDD 6 will read out the digest digital video signal from the recording area 51B of the recording medium. The readout digest digital video signal is transmitted from the HDD to the CPU 4 via the CPU buffer 5. The CPU 4 extracts the main components from the digest digital video signal, and arranges the extracted main components into a compression-resultant digest digital video signal. The CPU 4 outputs the compression-resultant digest digital video signal to the picture expander 3. The picture expander 3 expands and decodes the compression-resultant digest digital video signal into an output digest digital video signal. The picture expander 3 feeds the output digest digital video signal to the display. Pictures (digest pictures) represented by the output digest digital video signal are indicated on the display. In addition, the CPU 4 extracts the additional information pieces from the digest digital video signal. The extracted additional information pieces contain the recording position information piece NRP and the recording date information piece. The CPU 4 outputs the extracted additional information pieces to the display. The additional information pieces are indicated on the display while being superimposed on the digest pictures.

When the user actuates the operation unit 21 to request the reproduction of the compression-resultant digital video signal corresponding to a digest picture indicated on the display, the CPU 4 controls the DTR 7 in response to the recording position information piece NRP corresponding to the indicated digest picture. Thereby, an accessed point on the magnetic tape is moved to a position which precedes the NRP recording position by a distance corresponding to one marking signal VISSID. Thus, the accessed point is moved into correspondence with a marking signal VISSID(k−1) where "k" denotes the NRP recording position (the recording position represented by the information piece NRP). Then, the CPU 4 starts the DTR 7 reproducing the compression-resultant digital video signal from the third region TR3 of the magnetic tape. The reproduced compression-resultant digital video signal is transmitted from the DTR 7 to the HDD 6 via the DTR buffer 8. The CPU 4 controls the HDD 6 so that the HDD 6 will record the compression-resultant digital video signal into the recording area 51 of the recording medium. The CPU 4 controls the DTR 7 to continue the signal reproduction until the compression-resultant digital video signal corresponding to a marking signal VISSID(k+1) is reproduced. When the reproduction of the compression-resultant digital video signal corresponding to the marking signal VISSID(k+1) has been completed, the CPU 4 suspends operation of the DTR 7 and changes the DTR 7 into a stand-by state. At this time, the accessed point on the magnetic tape agrees with a position corresponding to a marking signal VISSID(k+2). Then, the CPU 4 controls the HDD 6 so that the HDD 6 will read out the compression-resultant digital video signal from the recording area 51 of the recording medium. The readout-compression-resultant digital video signal is transmitted from the HDD 6 to the CPU 4 via the CPU buffer 5. The CPU 4 feeds the compression-resultant digital video signal to the picture expander 3. Accordingly, pictures represented by the compression-resultant digital video signal are indicated on the display.

In the case where the user actuates the operation unit 21 to request the reproduction of the compression-resultant digital video signal corresponding to a marking signal VISSID(k−2), the CPU 4 controls the DTR 7 so that the accessed point will be moved back from the position "VISSID(k+2)" by a distance corresponding to four marking signals or five marking signals. Then, the CPU 4 starts the DTR 7 reproducing the compression-resultant digital video signal from the third region TR3 of the magnetic tape.

User's request for the reproduction of the compression-resultant digital video signal corresponding to a digest picture indicated on the display is inputted via the operation unit 21 as follows. In a first way, a recording position or a recording date equal to the contents of the recording position information piece NRP or the recording date information piece indicated on the display is inputted via the operation unit 21. In a second way, a trigger signal is inputted via the operation unit 21 while a desired digest picture continues to be indicated on the display.

In the case where the digest digital video signal has portions each representing plural successive frames, the sequence of the processes implemented by the CPU 4 changes in the following points. When the user actuates the operation unit 21 to request the reproduction of the compression-resultant digital video signal corresponding to a digest picture indicated on the display, the CPU 4 controls the DTR 7 in response to the recording position information piece NRP corresponding to the indicated digest picture. Thereby, an accessed point on the magnetic tape is equalized to the NRP recording position. Then, the CPU 4 starts the DTR 7 reproducing the compression-resultant digital video signal from the third region TR3 of the magnetic tape.

In the case where the digest digital video signal has 1-frame-corresponding portions and also portions each representing plural successive frames, the sequence of the processes implemented by the CPU 4 changes in the following points. Pictures represented by the 1-frame-corresponding portions of the digest digital video signal are indicated on the display before pictures represented by the portions each representing plural successive frames are indicated on the display. When the user actuates the operation unit 21 to request the reproduction of the compression-resultant digital video signal corresponding to a digest picture indicated on the display, the CPU 4 controls the HDD 6 so that the HDD 6 will read out the digest digital video signal from the recording area 51B of the recording medium which exactly corresponds to a desired portion representing plural successive frames. The readout digest digital video signal is transmitted from the HDD 6 to the CPU 4 via the CPU buffer 5. The CPU 4 converts the digest digital video signal into the compression-resultant digest digital video signal. The CPU 4 outputs the compression-resultant digest digital video signal to the picture expander 3. Accordingly, pictures represented by the compression-resultant digest digital video signal are indicated on the display. In addition, the CPU 4 controls the DTR 7 in response to the recording position information piece NRP in the present digest digital video signal. Thereby, an accessed point on the magnetic tape is moved to a position which follows the NRP recording position by a distance corresponding to one marking signal VISSID. Thus, the accessed point is moved into correspondence with a marking signal VISSID(k+1) where "k" denotes the NRP recording position (the recording position represented by the information piece NRP). Then, the CPU 4 starts the DTR 7 reproducing the compression-resultant digital video signal from the third region TR3 of the magnetic tape. The reproduced compression-resultant digital video signal is transmitted from the DTR 7 to the HDD 6 via the DTR buffer 8. The CPU 4 controls the HDD 6 so that the HDD 6 will record the compression-resultant digital video signal into the recording area 51 of the recording medium. When the compression-resultant digital video signal which exactly corresponds to the desired portion representing plural successive frames has been outputted to the picture expander 3, the CPU 4 controls the HDD 6 so that the HDD 6 will read out the compression-resultant digital video signal from the recording area 51 of the recording medium. The readout-compression-resultant digital video signal is transmitted from the HDD 6 to the CPU 4 via the CPU buffer 5. The CPU 4 feeds the compression-resultant digital video signal to the picture expander 3. Accordingly, pictures represented by the compression-resultant digital video signal are indicated on the display after pictures represented by the digest digital video signal are indicated on the display.

Signal portions corresponding to the digest digital video signal may be excluded from the compression-resultant digital video signal recorded on the third region TR3 of the magnetic tape.

The signal compression implemented by the picture compressor 1 conforms to the MPEG (Motion Picture Experts Group) standards. Preferably, the extracted 1-frame-corresponding signal portions which form the digest digital video signal correspond to intra frames. In other words, the extracted 1-frame-corresponding signal portions agree with signal portions subjected to an intra frame encoding process. The signal compression implemented by the picture compressor 1 may conform to the JPEG (Joint Photographic Experts Group) standards.

Ninth Embodiment

A ninth embodiment of this invention is similar to the first embodiment thereof except for design changes explained hereinafter. In the ninth embodiment, the CPU 4 is programmed to enable a search for a desired picture.

Figure 16:
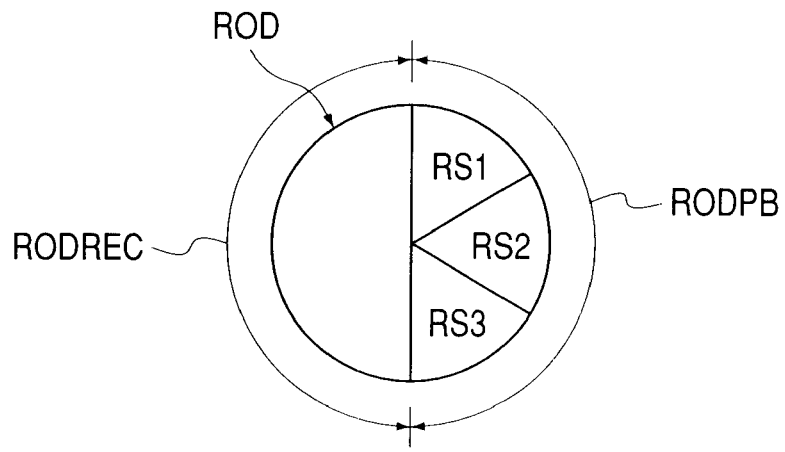
FIG. 16 is a diagram of a magnetic disc in a hard disc drive (HDD) in a video data recording and reproducing apparatus according to a ninth embodiment of this invention.

With reference to FIG. 16, the magnetic disc in the HDD 6 has a recording area ROD which is divided into two halves RODREC and RODPB assigned to the compression-resultant digital video signal in the inward flow and the compression-resultant digital video signal in the outward flow, respectively. The half recording area RODPB is divided into three regions RS1, RS2, and RS2 each corresponding to one recording unit RU with respect to the DTR 7. One recording unit RU with respect to the DTR 7 corresponds to a time interval of about 5 minutes related to the input digital video signal.

Figure 17:
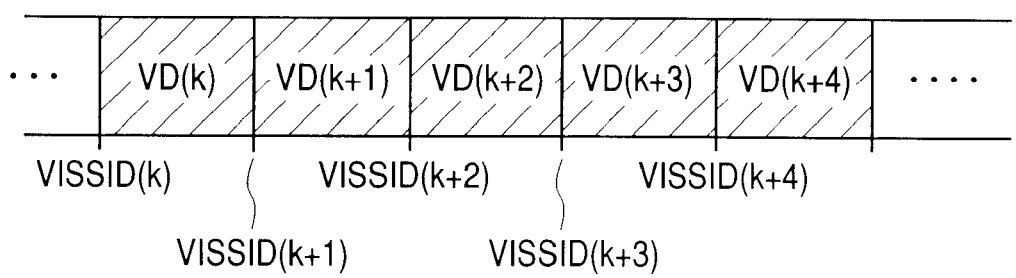
FIG. 17 is a diagram of segments of a compression-resultant digital video signal on a magnetic tape in the apparatus according to the ninth embodiment of this invention.

With reference to FIG. 17, the compression-resultant digital video signal on the magnetic tape in the DTR 7 has a sequence of signal segments VD(k), VD(k+1), ... Marking signals VISSID(k), VISSID(k+1), ... on the magnetic tape correspond to the starting edges of the signal segments VD(k), VD(k+1), ..., respectively. In other words, the marking signals VISSID(k), VISSID(k+1), ... on the magnetic tape correspond to the respective boundaries among the signal segments VD(k), VD(k+1), ... When the signal reproduction starting from the signal segment VD(k) is requested, the CPU 4 controls the DTR 7 so that the DTR 7 will reproduce the signal segments VD(k−1), VD(k), and VD(k+1) from the magnetic tape. The signal segments VD(k−1), VD(k), and VD(k+1) are transmitted from the DTR 7 to the HDD 6 via the DTR buffer 8. The CPU 4 controls the HDD 6 so that the HDD 6 will write the signal segments VD(k−1), VD(k), and VD(k+1) into the regions RS1, RS2, and RS3 of the magnetic disc, respectively.

The CPU 4 is programmed to implement the following sequence of processes related to a normal-direction search at a high speed equal to ten times the normal playback speed. First, the CPU 4 controls the HDD 6 so that the HDD 6 will skippingly read out the compression-resultant digital signal, that is, the signal segment VD(k−1), from the region RS1 of the magnetic disc at a rate corresponding to one frame per ten successive frames. The readout compression-resultant digital video signal is transmitted from the HDD 6 to the picture expander 3 via the CPU buffer 5 and the CPU 4. Thus, pictures represented by the readout compression-resultant digital signal are indicated on the display. In this case, the playback speed is equal to ten times the normal playback speed. Subsequently, the compression-resultant digital signal, that is, the signal segment VD(k), is skippingly read out from the region RS2 of the magnetic disc in a way similar to the above-mentioned way. The readout compression-resultant digital video signal is transmitted from the HDD 6 to the picture expander 3 so that pictures represented by the readout compression-resultant digital signal are indicated on the display.

Then, the compression-resultant digital signal, that is, the signal segment VD(k+1), is skippingly read out from the region RS3 of the magnetic disc in a way similar to the above-mentioned way. The readout compression-resultant digital video signal is transmitted from the HDD 6 to the picture expander 3 so that pictures represented by the readout compression-resultant digital signal are indicated on the display. In addition, the CPU 4 controls the DTR 7 so that the DTR 7 will reproduce the signal segment VD(k+2) from the magnetic tape. The signal segment VD(k+2) is transmitted from the DTR 7 to the HDD 6 via the DTR buffer 8. The CPU 4 controls the HDD 6 so that the HDD 6 will write the signal segment VD(k+2) over the signal segment VD(k−1) on the region RS1 of the magnetic disc. The control of the HDD 6 by the CPU 4 is designed so that the skip readout of the signal segment VD(k+1) from the magnetic disc and the writing of the signal segment VD(k+2) into the magnetic disc will be implemented on a time sharing basis.

After the skip readout of the signal segment VD(k+1) from the region RS3 of the magnetic disc has been completed, the CPU 4 starts the HDD 6 skippingly reading out the signal segment VD(k+2) from the region RS1 of the magnetic disc. In addition, the CPU 4 controls the DTR 7 and the HDD 6 so that the signal segment VD(k+3) will be transferred from the magnetic tape in the DTR 7 to the region RS2 of the magnetic disc in the HDD 6. The skip readout of the signal segment VD(k+2) from the magnetic disc and the writing of the signal segment VD(k+3) into the magnetic disc are implemented on a time sharing basis. The above-mentioned processes are iterated so that the normal-direction search at a high speed equal to ten times the normal playback speed continues.

A normal-direction search at a high speed equal to twice the normal playback speed, and a normal-direction search at a high speed equal to four times the normal playback speed are executed similarly to the normal-direction search at a high speed equal to ten times the normal playback speed.

A normal-direction search at a high speed equal to thirty times the normal playback speed is similar to the normal-direction search at a high speed equal to ten times the normal playback speed except for design changes explained later.

Figure 18:
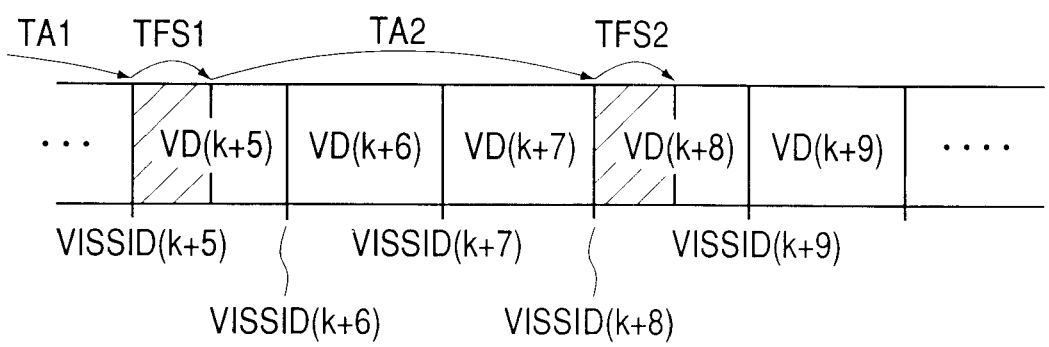
FIG. 18 is a diagram of segments of the compression-resultant digital video signal on the magnetic tape in the apparatus according to the ninth embodiment of this invention.

The CPU 4 is programmed to implement the following sequence of processes related to the normal-direction search at a high speed equal to thirty times the normal playback speed. It is assumed that the accessed point on the magnetic tape in the DTR 7 initially corresponds to a marking signal VISSID(k+2). When the HDD 6 completes the skip readout of the compression-resultant digital video signal from the region RS2 of the magnetic disc, the CPU 4 controls the DTR 7 so that the accessed point on the magnetic tape will be moved forward by a distance corresponding to three marking signals VISSID. Thus, the present access point on the magnetic tape corresponds to a marking signal VISSID (k+5). The access time to move the access point on the magnetic tape is denoted by TA1 in FIG. 18. Subsequently, the CPU 4 controls the DTR 7 and the HDD 6 so that only a former half of the signal segment VD(k+5) will be transferred from the magnetic tape in the DTR 7 to the region RS1 of the magnetic disc in the HDD 6 for a time TFS1 (see FIG. 18). In FIG. 18, the left-hand hatched region denotes the transferred former half of the signal segment VD(k+5).

Then, the CPU 4 controls the DTR 7 so that the accessed point on the magnetic tape will be moved forward by a distance corresponding to three marking signals VISSID. Thus, the present access point on the magnetic tape corresponds to a marking signal VISSID(k+8). The access time to move the access point on the magnetic tape is denoted by TA2 in FIG. 18. Subsequently, the CPU 4 controls the DTR 7 and the HDD 6 so that only a former half of the signal segment VD(k+8) will be transferred from the magnetic tape in the DTR 7 to the region RS1 of the magnetic disc in the HDD 6 for a time TFS2 (see FIG. 18). In FIG. 18, the right-hand hatched region denotes the transferred former half of the signal segment VD(k+8). In this way, the region RS1 of the magnetic disc is fully occupied by the former half of the signal segment VD(k+5) and the former half of the signal segment VD(k+8).

During the normal-direction search at a high speed equal to thirty times the normal playback speed, the skipping rate in the readout of the compression-resultant digital video signal from the magnetic disc by the HDD 6 may correspond to one frame per eight successive frames. In addition, every incremental movement in the access point on the magnetic tape in the DTR 7 may correspond to four marking signals VISSID.

The CPU 4 is programmed to implement the following sequence of processes related to a reverse-direction search at a high speed equal to ten times the normal playback speed. First, the CPU 4 controls the HDD 6 so that the HDD 6 will skippingly read out the compression-resultant digital signal, that is, the signal segment VD(k+1), from the region RS3 of the magnetic disc in the reverse direction at a rate corresponding to one frame per ten successive frames. The readout compression-resultant digital video signal is transmitted from the HDD 6 to the picture expander 3 via the CPU buffer 5 and the CPU 4. Thus, pictures represented by the readout compression-resultant digital signal are indicated on the display in the reverse direction. In this case, the playback speed is equal to ten times the normal playback speed. Subsequently, the compression-resultant digital signal, that is, the signal segment VD(k), is skippingly read out from the region RS2 of the magnetic disc in a way similar to the above-mentioned way. The readout compression-resultant digital video signal is transmitted from the HDD 6 to the picture expander 3 so that pictures represented by the readout compression-resultant digital signal are indicated on the display in the reverse direction.

Then, the compression-resultant digital signal, that is, the signal segment VD(k−1), is skippingly read out from the region RS1 of the magnetic disc in a way similar to the above-mentioned way. The readout compression-resultant digital video signal is transmitted from the HDD 6 to the picture expander 3 so that pictures represented by the readout compression-resultant digital signal are indicated on the display in the reverse direction. In addition, the CPU 4 controls the DTR 7 so that the DTR 7 will reproduce the signal segment VD(k−2) from the magnetic tape. The signal segment VD(k−2) is transmitted from the DTR 7 to the HDD 6 via the DTR buffer 8. The CPU 4 controls the HDD 6 so that the HDD 6 will write the signal segment VD(k−2) over the signal segment VD(k+1) on the region RS3 of the magnetic disc. The control of the HDD 6 by the CPU 4 is designed so that the skip readout of the signal segment VD(k−1) from the magnetic disc and the writing of the signal segment VD(k−2) into the magnetic disc will be implemented on a time sharing basis.

After the skip readout of the signal segment VD(k−1) from the region RS1 of the magnetic disc has been completed, the CPU 4 starts the HDD 6 skippingly reading out the signal segment VD(k−2) from the region RS3 of the magnetic disc. In addition, the CPU 4 controls the DTR 7 and the HDD 6 so that the signal segment VD(k−3) will be transferred from the magnetic tape in the DTR 7 to the region RS2 of the magnetic disc in the HDD 6. The skip readout of the signal segment VD(k−2) from the magnetic disc and the writing of the signal segment VD(k−3) into the magnetic disc are implemented on a time sharing basis. The above-mentioned processes are iterated so that the reverse-direction search at a high speed equal to ten times the normal playback speed continues.

A reverse-direction search at a high speed equal to eight times the normal playback speed is similar to the reverse-direction search at a high speed equal to ten times the normal playback speed except that the skipping rate in the readout of the compression-resultant digital video signal from the HDD 6 corresponds to one frame per eight successive frames. A reverse-direction search at a high speed equal to or greater than ten times the normal playback speed is implemented by using the technique in the normal direction search at a high speed equal to thirty times the normal playback speed.

When user's request for a change from the search to the normal playback is inputted via the operation unit 21, the CPU 4 replaces the skip signal readout by the normal signal readout in the HDD 6.

The CPU 4 may monitor the amount (the number of bits) of the compression-resultant digital video signal in the magnetic disc which has not yet been read out by the HDD 6. In this case, the CPU 4 compares the monitored amount with a predetermined reference amount. When the monitored amount drops to or below the predetermined reference amount, the CPU 4 controls the DTR 7 and the HDD 6 to execute the transfer of the compression-resultant digital video signal from the magnetic tape in the DTR to the magnetic disc in the HDD 6. According to this design, the amount (the number of bits) of the compression-resultant digital video signal in the magnetic disc which has not yet been read out by the HDD 6 can be prevented from decreasing to a null level.

The signal compression implemented by the picture compressor 1 conforms to the MPEG (Motion Picture Experts Group) standards. Preferably, the skip-readout-resultant digital video signal outputted from the HDD 6 corresponds to only intra frames. The signal compression implemented by the picture compressor 1 may conform to the JPEG (Joint Photographic Experts Group) standards.

Tenth Embodiment

Figure 19:
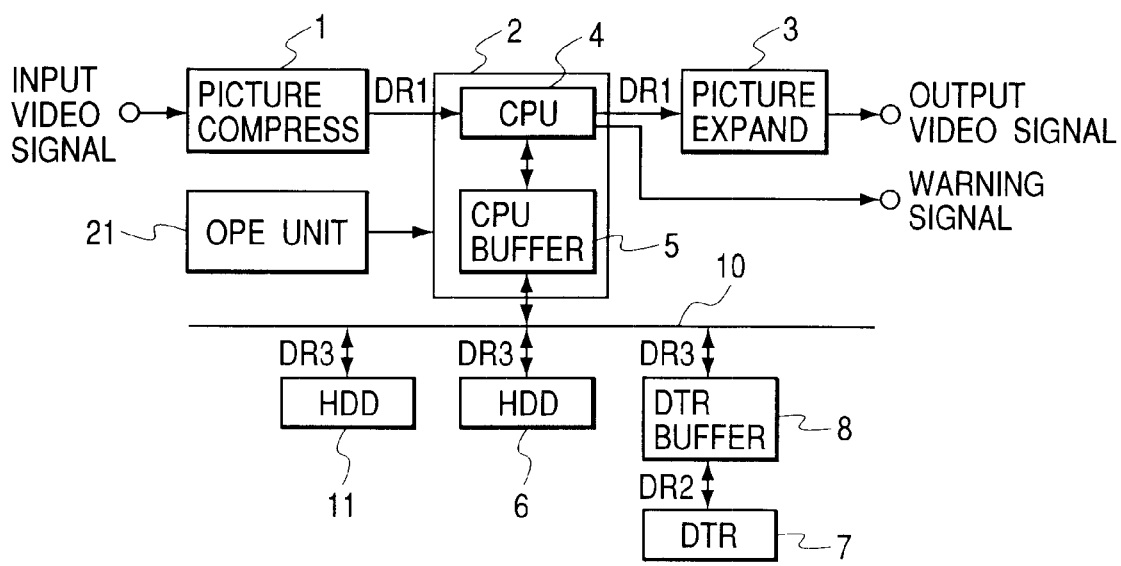
FIG. 19 is a block diagram of a video data recording and reproducing apparatus according to a tenth embodiment of this invention.

FIG. 19 shows a tenth embodiment of this invention which is similar to one of the first to ninth embodiments thereof except that an HDD 11 is added. The HDD 11 is connected to the interface bus 10.

The HDD 11 is assigned to the compression-resultant digital video signal in the inward flow while the HDD 6 is assigned to the compression-resultant digital video signal in the outward flow.

Eleventh Embodiment

An eleventh embodiment of this invention is similar to the tenth embodiment thereof except for the following design changes. In the eleventh embodiment of this invention, during a first time period, the HDD 6 writes the compression-resultant digital video signal into the magnetic disc therein while the HDD 11 reads out the compression-resultant digital video signal from the magnetic disc therein. During a second time period after the first time period, the HDD 6 reads out the compression-resultant digital video signal from the magnetic disc therein while the HDD 11 writes the compression-resultant digital video signal into the magnetic disc therein. Thereafter, these processes are iterated.

Twelfth Embodiment

Figure 20:
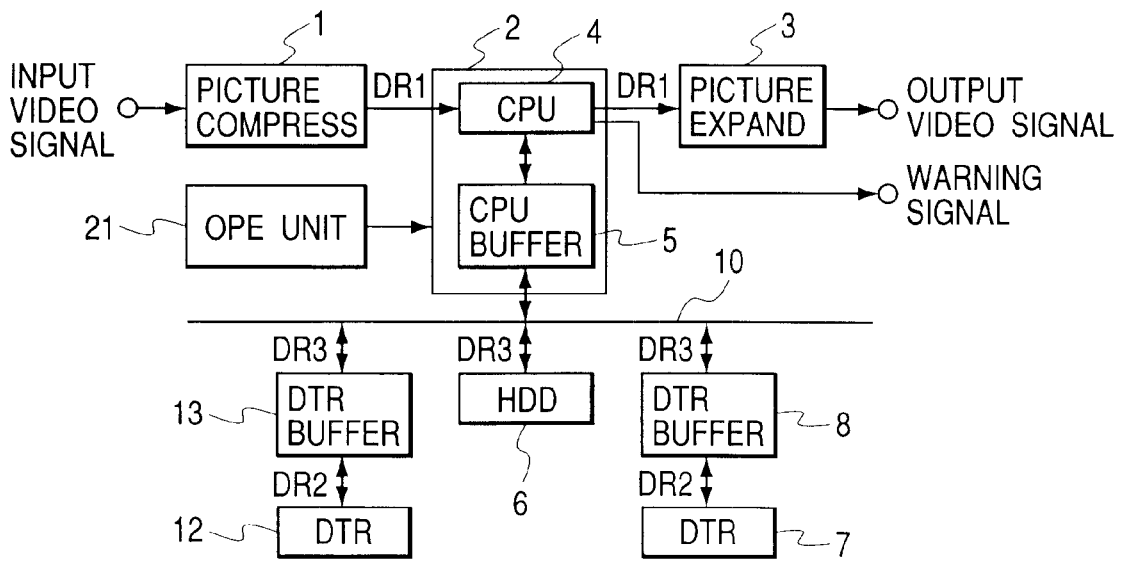
FIG. 20 is a block diagram of a video data recording and reproducing apparatus according to a twelfth embodiment of this invention.

FIG. 20 shows a twelfth embodiment of this invention which is similar to one of the first to ninth embodiments thereof except that a DTR 12 and a DTR buffer 13 are added. The DTR 12 is connected to the interface bus 10 via the DTR buffer 13.

The DTR 12 is used exclusively for recording the compression-resultant digital video signal on the magnetic tape therein while the DTR 7 is used exclusively used for reproducing the compression-resultant digital video signal from the magnetic tape therein.

Thirteenth Embodiment

A thirteenth embodiment of this invention is similar to one of the first to twelfth embodiments thereof except for the following design changes. In the thirteenth embodiment of this invention, the output signal of the picture compressor 1 has a variable data rate DR1.

In the thirteenth embodiment of this invention, the CPU 4 monitors the amount (the number of bits) of the compression-resultant digital video signal in the CPU buffer 5. In addition, the CPU 4 changes the period T1 and the time interval T3 in response to the monitored amount of the compression-resultant digital video signal in the CPU buffer 5.

Fourteenth Embodiment

A fourteenth embodiment of this invention is similar to one of the first to thirteenth embodiments thereof except that the input digital video signal fed to the picture compressor 1 is replaced by a digital signal containing text information which is transmitted via a communication network.

Fifteenth Embodiment

A fifteenth embodiment of this invention is similar to one of the first to thirteenth embodiments thereof except that the input digital video signal fed to the picture compressor 1 contains audio information as well as video information.

Sixteenth Embodiment

A sixteenth embodiment of this invention is similar to one of the first to fifteenth embodiments thereof except that the HDD 6 is replaced by a semiconductor memory of the RAM type.

Seventeenth Embodiment

A seventeenth embodiment of this invention is similar to one of the first to sixteenth embodiments thereof except that the interface bus 10 is replaced by a communication line.

Eighteenth Embodiment

Any one of the first to seventeenth embodiments of this invention may be modified into an eighteenth embodiment thereof which relates to a video data recording apparatus without a portion for reproducing the compression-resultant digital video signal from the magnetic tape in the DTR 7.

Nineteenth Embodiment

Any one of the first to seventeenth embodiments of this invention may be modified into a nineteenth embodiment thereof which relates to a video data reproducing apparatus without a portion for recording the compression-resultant digital video signal on the magnetic tape in the DTR 7.

What is claimed is:

1. A digital data recording and reproducing apparatus for recording input digital data on a recording medium and reproducing said recorded digital data, the apparatus comprising:

a first recording medium on which a signal can be recorded on an endless basis;

first recording and reproducing means including:
  1) means for recording digital data on the first recording medium, and
  2) means for reproducing said recorded digital data from the first recording medium;

a second recording medium having an access time longer than an access time of the first recording medium, the second recording medium having a recording capacity larger than a recording capacity of the first recording medium;

second recording and reproducing means including:
  1) means for recording digital data on the second recording medium, and
  2) means for reproducing said recorded digital data from the second recording medium;

means for implementing a first mode of operation which records said input data on the first recording medium by the first recording and reproducing means on an endless basis;

means for implementing a second mode of operation such that each time an amount of data recorded on the first recording medium by the first mode of operation reaches a predetermined amount equal to or smaller than the recording capacity of the first recording medium, data recorded on the first recording medium are reproduced, and are recorded on the second recording medium by the second recording and reproducing means;

means for implementing a third mode of operation which reproduces data recorded on the second recording medium by the second recording and reproducing means and which records said reproduced data on the first recording medium by the first recording and reproducing means;

means for implementing a fourth mode of operation which reproduces data recorded on the first recording medium by the third mode of operation and which outputs said data;

means for executing the first mode of operation, the second mode of operation, the third mode of operation, and the fourth mode of operation on a time sharing basis;

wherein a data rate related to transfer of data to the second recording medium is greater than a data rate related to the input data;

means for collating a portion of data on the second recording medium with a corresponding portion of data on the first recording medium to decide whether or not the portion of data on the second recording medium is correct; and a buffer provided in the second recording and reproducing means;

wherein writing of data into the buffer is consecutively executed a first predetermined number of times and thereby recording of data on the second recording medium is continuously implemented with respect to execution of a second predetermined number of times of recording data on the first recording medium, the second predetermined number being greater than the first predetermined number, further comprising means for transferring data from the first recording medium to the second recording medium when it is decided that the portion of data on the second recording medium is not correct, and additional means, operating when it is decided that the portion of data on the second recording medium is not correct, for recording data on a first region of the second recording medium, the first region differing from a second region on which is recorded the portion of data.

2. A digital data reproducing apparatus for reproducing digital data recorded on a large-capacity recording medium, comprising:

reproducing means for reproducing digital data recorded on the large-capacity recording medium;

a small-capacity recording medium having a recording capacity smaller than a capacity of the large-capacity recording medium, the small-capacity recording medium having an access time shorter than an access time of the large-capacity recording medium;

recording and reproducing means including:
1) means for recording digital data on the small-capacity recording medium, and
2) means for reproducing said recorded digital data;

means, operating when digital data recorded on the large-capacity recording medium are reproduced by the reproducing means, for recording the digital data reproduced from the large-capacity recording medium on the small-capacity recording medium by the recording and reproducing means, and for reproducing said recorded data from the small-capacity recording means and then outputting said reproduced data;

means for implementing a first display mode in which a video signal in data being recorded and a video signal in data being reproduced are indicated by a display on a side-by-side basis;

means for implementing a second display mode in which only a video signal in data being recorded is indicated by the display;

means for implementing a third display mode in which only a video signal in data being reproduced is indicated by the display;

means for implementing change among the first display mode, the second display mode, and the third display mode; and means, operating when digital data recorded on the large-capacity recording medium are reproduced by the reproducing means, for dividing a process of recording data on the small-capacity recording medium into a plurality of stages.

3. A digital data reproducing apparatus as recited in claim 2, further comprising means for deciding whether or not an amount of data on the small-capacity recording medium reaches a predetermined reference amount smaller than the recording capacity of the small-capacity recording medium, and means for outputting a warning signal when the amount of data on the small-capacity recording medium reaches the predetermined reference amount.

4. A digital data recording and reproducing apparatus for recording input digitized video data on a recording medium and reproducing said recorded video data, comprising:

a first recording medium on which a signal can be recorded on an endless basis;

first recording and reproducing means including 1) means for recording digital data on the first recording medium, and 2) means for reproducing said recorded digital data from the first recording medium;

a second recording medium having an access time longer than an access time of the first recording medium, the second recording medium having a recording capacity larger than a recording capacity of the first recording medium;

second recording and reproducing means including 1) means for recording digital data on the second recording medium, and 2) means for reproducing said recorded digital data from the second recording medium;

means for implementing a first recording mode of operation in which said input video data are recorded on the first recording medium by the first recording and reproducing means on an endless basis and in which digest data containing extracted video data, which are in unit of frame and which are extracted from said input video data, are recorded on the first recording medium;

means for implementing a second recording mode of operation in which each time an amount of data recorded on the first recording medium by the first recording mode of operation reaches a predetermined amount equal to or smaller than the recording capacity of the first recording medium, video data recorded on the first recording medium are reproduced, and are recorded on the second recording medium by the second recording and reproducing means;

means for implementing a third recording mode of operation in which digest data recorded on the first recording medium by the first recording mode of operation are reproduced, and are recorded on a predetermined area of the second recording medium by the second recording and reproducing means, the predetermined area being separate from a recording area for said video data;

means for implementing a first reproducing mode of operation in which video data recorded on the second recording medium are reproduced by the second recording and reproducing means, and are recorded on the first recording medium by the first recording and reproducing means;

means for implementing a second reproducing mode of operation in which digest data recorded on the second recording medium are reproduced by the second recording and reproducing means, and are recorded on the first recording medium by the first recording and reproducing means;

means for implementing a third reproducing mode of operation in which extracted video data contained in digest data or video data recorded on the first recording medium by the first or second reproducing mode of operation are reproduced, and are outputted;

means for executing the first recording mode of operation, the second recording mode of operation, the third recording mode of operation, the first reproducing mode of operation, the second reproducing mode of operation, and the third reproducing mode of operation on a time sharing basis, wherein the second recording medium is replaceable, and further comprising means, operating when the second recording medium is inserted into the second recording and reproducing means, for executing the second reproducing mode of operation;

means for adding record position information to the digest data, the record position information representing a record position of corresponding video data on the second recording medium, and operating means for instructing reproduction of video data corresponding to said digest data by referring to extracted video data contained in said digest data by a user, and means for implementing an accessing process in which the second recording and reproducing means accesses said video data on the second recording medium by referring to record position information contained in digest data related to a reproducing instruction by the user, and for subsequently executing the first and third reproducing modes of operation to output corresponding video data, wherein said input video data are temporally continuous video data, and further comprising means, operable when a reproducing mode of operation is executed in response to said record position information, for starting the first reproducing mode of operation from video data slightly temporally preceding said video data corresponding to said record position information.

5. A digital data recording and reproducing apparatus for recording input digitized video data on a recording medium and reproducing said recorded video data, comprising:

a first recording medium on which a signal can be recorded on an endless basis;

first recording and reproducing means including 1) means for recording digital data on the first recording medium, and 2) means for reproducing said recorded digital data from the first recording medium;

a second recording medium having an access time longer than an access time of the first recording medium, the second recording medium having a recording capacity larger than a recording capacity of the first recording medium;

second recording and reproducing means including 1) means for recording digital data on the second recording medium, and 2) means for reproducing said recorded digital data from the second recording medium;

means for implementing a first recording mode of operation in which said input video data are recorded on the first recording medium by the first recording and reproducing means on an endless basis and in which digest data containing extracted video data, which are in unit of frame and which are extracted from said input video data, are recorded on the first recording medium;

means for implementing a second recording mode of operation in which each time an amount of data recorded on the first recording medium by the first recording mode of operation reaches a predetermined amount equal to or smaller than the recording capacity of the first recording medium, video data recorded on the first recording medium are reproduced, and are recorded on the second recording medium by the second recording and reproducing means;

means for implementing a third recording mode of operation in which digest data recorded on the first recording medium by the first recording mode of operation are reproduced, and are recorded on a predetermined area of the second recording medium by the second recording and reproducing means, the predetermined area being separate from a recording area for said video data;

means for implementing a first reproducing mode of operation in which video data recorded on the second recording medium are reproduced by the second recording and reproducing means, and are recorded on the first recording medium by the first recording and reproducing means;

means for implementing a second reproducing mode of operation in which digest data recorded on the second recording medium are reproduced by the second recording and reproducing means, and are recorded on the first recording medium by the first recording and reproducing means;

means for implementing a third reproducing mode of operation in which extracted video data contained in digest data or video data recorded on the first recording medium by the first or second reproducing mode of operation are reproduced, and are outputted;

means for executing the first recording mode of operation, the second recording mode of operation, the third recording mode of operation, the first reproducing mode of operation, the second reproducing mode of operation, and the third reproducing mode of operation on a time sharing basis, wherein the second recording medium is replaceable, and further comprising means, operating when the second recording medium is inserted into the second recording and reproducing means, for executing the second reproducing mode of operation;

means for adding record position information to the digest data, the record position information representing a record position of corresponding video data on the second recording medium, and operating means for instructing reproduction of video data corresponding to said digest data by referring to extracted video data contained in said digest data by a user, and means for implementing an accessing process in which the second recording and reproducing means accesses said video data on the second recording medium by referring to record position information contained in digest data related to a reproducing instruction by the user, and for subsequently executing the first and third reproducing modes of operation to output corresponding video data, wherein said input video data include a plurality of programs, and said extracted video data are composed of thinned video data formed by extracting video data from said input video data for every given sample time, and of partial continuous video data formed by extracting continuous video data corresponding to first predetermined times of the respective programs.

6. A digital data recording and reproducing apparatus as recited in claim 5, further comprising means, operating when said reproducing instruction is made by the user, for referring to said thinned video data thereby executing the first and third reproducing modes of operation with respect to said partial continuous video data corresponding to said thinned video data, means for executing the first reproducing mode of operation with respect to video data corresponding to said partial continuous video data after end of said first reproducing mode of operation with respect to said partial continuous video data, and means for executing the third reproducing mode of operation with respect to video data temporally continuous with said partial continuous video data after the third reproducing mode of operation with respect to said partial continuous video data.

* * * * *